United States Patent [19]

Arnosti et al.

[11] Patent Number: 5,159,166
[45] Date of Patent: Oct. 27, 1992

[54] DRAWROLL UNIT

[75] Inventors: Vittorino Arnosti, Pfungen; Konrad Boos, Sirnach; Bruno Gemperle, Oberwangen; Felix Graf, Winterthur; Rodolf Leinhard, Pfungen; Emil Munz, Hettlingen; Richard Rollin, Winterthur; Rolf Widmer, Dorflingen; Armin Wirz, Ossingen, all of Switzerland

[73] Assignee: Rieter Machine Works, Ltd., Winterthur, Switzerland

[21] Appl. No.: 372,648

[22] Filed: Jun. 28, 1989

[30] Foreign Application Priority Data

Jun. 30, 1988 [CH] Switzerland .................. 02485/88

[51] Int. Cl.$^5$ .............................................. H05B 6/14
[52] U.S. Cl. ........................... 219/10.492; 219/10.61;
219/10.61 A; 219/10.61 R; 219/10.77;
219/10.79; 219/471; 384/99; 384/536; 464/17;
464/83; 192/106
[58] Field of Search ............... 219/10.492, 10.61 A,
219/469, 470, 471, 10.77, 10.61 R, 10.79;
384/99, 536; 192/106; 464/17, 83

[56] References Cited

U.S. PATENT DOCUMENTS

| | | | |
|---|---|---|---|
| 2,531,697 | 11/1950 | Meyerhans | 175/356 |
| 2,543,447 | 2/1951 | Elrod | 74/576 |
| 2,955,876 | 10/1960 | Kinsey | 301/5 |
| 3,412,228 | 11/1968 | Miyagi | 219/10.61 |
| 3,448,233 | 6/1969 | Landis | 219/10.61 |
| 3,508,024 | 4/1970 | Cannon | 219/10.61 |
| 3,509,320 | 4/1970 | Werner et al. | 219/471 |
| 3,529,117 | 9/1970 | Miyagi | 219/10.61 |
| 3,546,503 | 12/1970 | Richardson | 310/51 |
| 3,568,962 | 3/1971 | Janssen | 384/536 |
| 3,581,060 | 5/1971 | Bauer | 219/469 |
| 3,581,812 | 6/1971 | Fleissner | 165/89 |
| 3,612,830 | 10/1971 | Dienes | 219/471 |
| 3,648,522 | 3/1972 | Hafeli et al. | 73/351 |
| 3,697,726 | 10/1972 | Geronine | 219/469 |
| 3,772,492 | 11/1973 | Brogeden et al. | 219/10.61 |
| 3,816,518 | 5/1974 | Arita | 219/471 |
| 3,866,014 | 2/1975 | Waller | 219/137 |
| 3,890,854 | 6/1975 | Pitner | 74/492 |
| 3,961,151 | 6/1976 | Danner | 219/10.49 |
| 4,447,796 | 5/1984 | Heinrichs | 336/60 |
| 4,457,667 | 7/1984 | Seibert et al. | 415/174 |
| 4,669,893 | 6/1987 | Chalaire et al. | 384/99 |

FOREIGN PATENT DOCUMENTS

| | | |
|---|---|---|
| 0109346 | 5/1984 | European Pat. Off. . |
| 0113407 | 7/1984 | European Pat. Off. . |
| 0406058 | 11/1924 | Fed. Rep. of Germany . |
| 1066818 | 10/1959 | Fed. Rep. of Germany . |
| 1271308 | 6/1968 | Fed. Rep. of Germany . |
| 1425073 | 12/1968 | Fed. Rep. of Germany . |
| 1564623 | 7/1969 | Fed. Rep. of Germany . |
| 1816001 | 7/1970 | Fed. Rep. of Germany . |
| 1575536 | 9/1970 | Fed. Rep. of Germany . |
| 1565149 | 10/1970 | Fed. Rep. of Germany . |
| 3316764 | 11/1984 | Fed. Rep. of Germany . |
| 3637256 | 5/1988 | Fed. Rep. of Germany . |
| 1545126 | 9/1968 | France . |
| 2152310 | 4/1973 | France . |

(List continued on next page.)

OTHER PUBLICATIONS

Japanese Abstracts, 61-207937, Sep. 16, 1986.

Primary Examiner—Bruce A. Reynolds
Assistant Examiner—Tu Hoang
Attorney, Agent, or Firm—Kenyon & Kenyon

[57] ABSTRACT

The drawroll unit has a heatable galette in which the shaft of the gallette is mounted in bearings which, in turn, are mounted via vibration damping devices in a stationary housing. The vibration damping devices may be in the form of bodies of interlaced wire, O-rings or the like. The vibration damping devices serve to damp vibrations of the shaft in a critical speed range within the normal speed range of the rotor so that the galette can be operated at any speed within the normal speed range.

38 Claims, 14 Drawing Sheets

FOREIGN PATENT DOCUMENTS

| | | |
|---|---|---|
| 2191652 | 2/1974 | France . |
| 6702310 | 2/1968 | Netherlands . |
| 0397895 | 8/1965 | Switzerland . |
| 0477578 | 8/1969 | Switzerland . |
| 0494952 | 8/1970 | Switzerland . |
| 0498385 | 10/1970 | Switzerland . |
| 0502445 | 1/1971 | Switzerland . |
| 0522214 | 4/1972 | Switzerland . |
| 0428832 | 5/1935 | United Kingdom . |
| 0620464 | 3/1949 | United Kingdom . |
| 0631520 | 11/1949 | United Kingdom . |
| 0978163 | 12/1964 | United Kingdom . |
| 1130374 | 10/1968 | United Kingdom . |
| 1204933 | 9/1970 | United Kingdom . |
| 1316547 | 5/1973 | United Kingdom . |
| 1379943 | 1/1975 | United Kingdom . |
| 1395570 | 5/1975 | United Kingdom . |
| 2111137 | 6/1983 | United Kingdom . |
| 2141288 | 12/1984 | United Kingdom . |

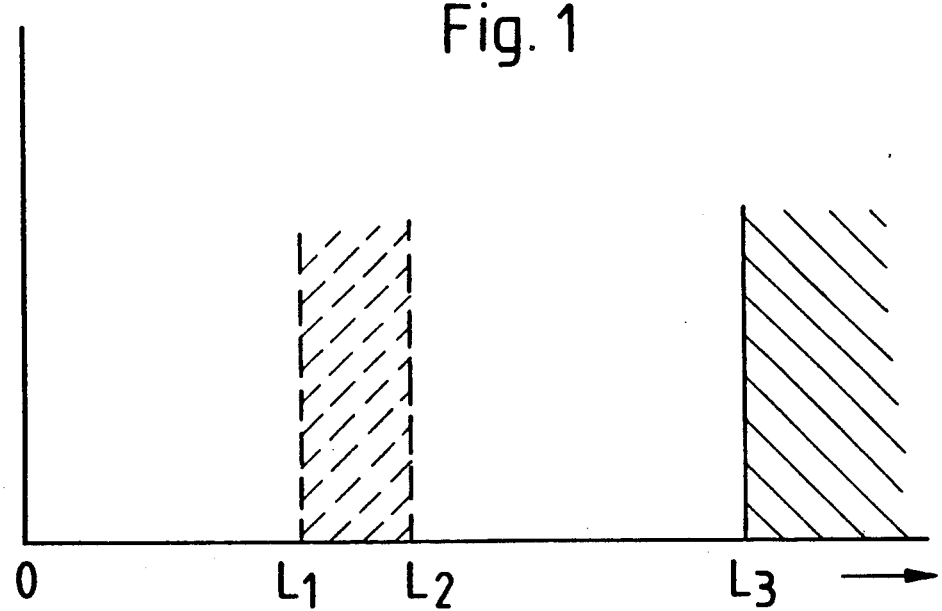
Fig. 1
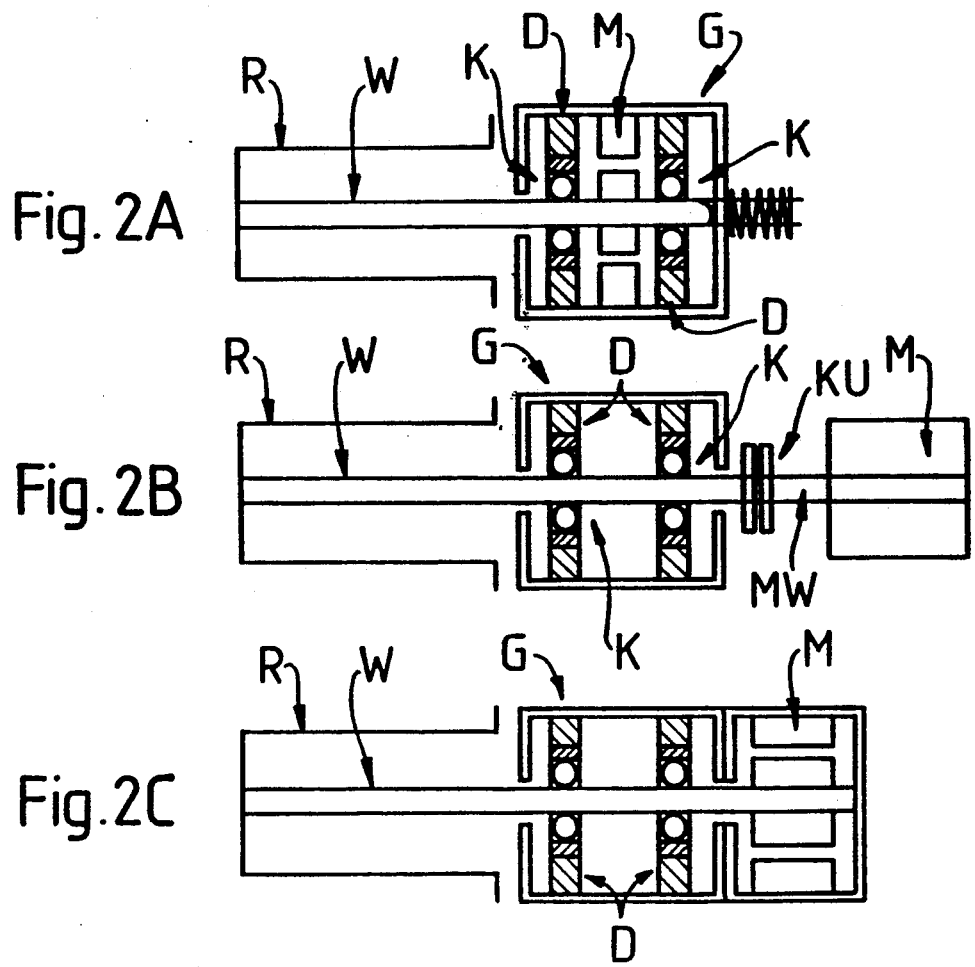
Fig. 2A
Fig. 2B
Fig. 2C

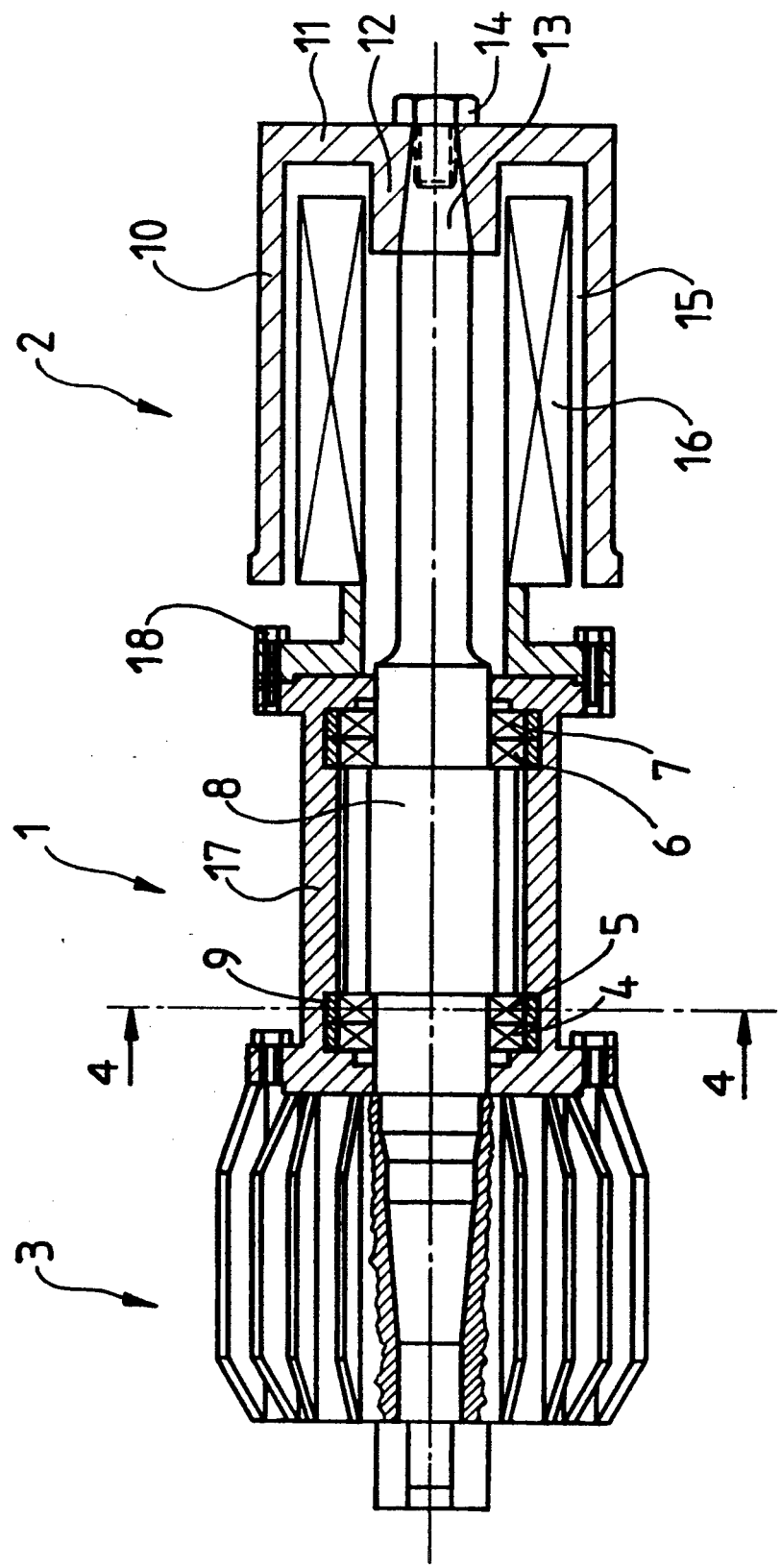

DRAWROLL UNIT

This invention relates to a drawroll unit. More particularly, this invention relates to a drawroll unit employing a heated galette for filament processing.

As is known, many types of drawroll units (also called "galettes" or "godets") have been used for filament processing, such as described in DAS 26 39 458, EP-A-113,407, U.S. Pat. No. 3,772,492, GB Patent 1,204,933 and others. Generally, such a unit includes a rotatable shaft which, at this present day, has a permissible speed range limited by the critical bending speed and that to such an extent that the permissible range (1) lies below a second critical bending speed of the shaft, and (2) shows a "discontinuity" around the first critical bending speed of the shaft.

Further, critical speeds of the unit (e.g. frame oscillations or torsional form of the shaft) can arise from the surroundings or the setting but these are mostly unimportant in their effect on the limitation of the permissible speed or they can be damped by elements in normal commercial usage.

The critical bending speeds of the shaft, which are mentioned in the present description, will be designated simply as "the critical speeds". The meaning of this statement is further explained by means of FIG. 1. This Figure merely shows a horizontal axis with a rotational speed between 0 and a limiting value of L3. Let it be assumed that a drawroll unit is designed for use with speeds up to L3. This limiting value is normally determined by the second critical speed, that is, when the speed of the rotating component of the unit is increased above L3, damage can be expected within an unacceptably short period.

The unit, however, cannot be used forthwith at any desired speed below the limiting value L3. Indeed, the first critical speed lies within the speed range 0 to L3 and damage is unavoidable when the unit is operated for long periods within a speed range L1 to L2 around this critical speed, so far as this unit is not balanced accurately and at considerable expense. Safe operation is, however, even then only possible when balance is retained. For this reason, the operating instructions require such units to operate such that the range L1 to L2 is only traversed in order to pass into the safer range L2 to L3.

If, in spite of this, operation in the range L1 to L2 is necessary, the vibrations of the unit must be regularly measured, as the conditions of balance can alter, for example, through heating up, dirt or loosening through internal tension, so that safe operation would be impaired.

In any case, continuous operation in the range L1 to L2 is only permissible when the complete unit is rebalanced after assembly. Thereby, a high degree of balance must be achieved with every alteration of the unit (exchange of a rotating part), the balancing process must be repeated. This involves considerable difficulty in the operation of such units. The conditions of balance must also be determined, or checked, in the course of time, to determine if the conditions have deteriorated for instance, due to thermic influences (in the case of heated drawrolls) which could lead to inadmissible vibrations and possibly damage.

Suitable measures have been tried out up to now especially through vibration damping in the mounting between the unit and the frame in order to increase the limiting value of L3, to narrow the resonant range L1 to L2 as far as possible, and/or to reduce vibrations of the whole unit.

In spite of this, up to now, every known drawroll unit has a more or less broad "forbidden speed zone" below the maximum speed, which limits the use for certain applications. Further, hitherto it has been necessary to balance the individual rotating parts of the unit completely as well as the complete unit itself. This is troublesome and expensive not only in the manufacture but also with maintenance (installation of a spare part) or adaptation of the unit.

Accordingly, it is an object of the invention to damp the vibration of a drawroll unit to the point that the permissible speed range runs continuously up to the upper limiting value and the balancing of the unit can be completely obviated It is another object of the invention to reduce the cost of a drawroll unit.

It is another object of the invention to provide a drawroll of balanced construction.

It is another object of the invention to minimize the number of parts required to assemble a drawroll unit.

It is another object of the invention to simplify the assembly of a drawroll unit.

It is another object of the invention to reduce the weight of a heated galette of a drawroll unit.

It is another object of the invention to control the temperature of a heated galette in a simple efficient manner.

Briefly, the invention provides a drawroll unit having a stationary part, a rotatable part, a bearing rotatably supporting the rotatable part in the stationary part and vibration damping means directly between the bearing and the stationary part.

The drawroll unit differs from the galettes described in DAS 26 39 458 in that the first critical speed is not displaced but forms a part of the normal range of use.

The negative manifestations which appear when rotating shafts are supported by means of rolling bearings are sufficiently well known. Depending on the manufacture, slight concentricity errors result on the shafts or rotating parts. These always lead to undesirable vibrations or oscillations of the shaft, which are first of all transmitted to the housing. Vibrations of this type can reduce the working life of the complete arrangement considerably or can even lead to a breakage of the shaft.

Various solutions are known for damping vibrations of this kind. The simplest method brings about vibration damping through the interpolation of rubber elastic material, as for example, as shown in DAS 26 39 458. However, it must be taken into account that materials of this type are not suitable for all applications, as rubber, as a rule, has only limited temperature resistance and is more or less attacked by lubricants and above all by aggressive materials.

In one embodiment, vibration damping is employed on a heatable galette for filament processing. In this embodiment, a galette is set in rotation by a shaft, which is guided in a bearing arrangement, and a means for damping vibrations is provided in the bearing arrangement.

In an additional aspect, the arrangement is characterized in that the bearing is held in a bearing bush which is resiliently mounted in a housing and the bearing is encircled by a narrow gap which can be filled with a liquid. In this way, the shaft oscillations or the vibrations of the shaft are, of course, transferred to the bearing bush, but because of the resilient bearing support, they only arrive considerably damped at the housing.

The bearing bush is supported by the housing via O-rings in a particularly advantageous and simple manner. The O-rings, which are in themselves very stable to temperature, are in addition, not exposed to extremely high temperatures, as the bearing bush conducts away part of the frictional heat engendered in the bearing.

There is a limited ring gap defined by the housing, the bearing bush and the O-rings which is preferably connected with a pressure oil source. In this way, a damping effect is engendered by oil displacement in the case of a radial vibration mode of the bush.

In this embodiment, the bearing bush is able to carry out at least radial relative movements with regard to the casing.

A resilient means is also provided to connect the bush with the housing to permit radial movement of the bush. For example, an arrangement of spring pins is disposed between the housing and the bearing bush, fundamentally coaxial with the shaft, which center the bearing bush and which also prevent hammering of the bush under a radial load. For this purpose, each spring pin is anchored with one end in the housing and the other end in the bush.

It has been shown to be expedient when the fixed ends of each spring pin are approximately the same length.

In a second embodiment, the arrangement is characterized by the fact that the bearing is supported over a body of interlaced wire in the bearing housing. In this way, an economical but effective arrangement for vibration damping of galettes is achieved, which is simple to manufacture and assemble, is completely maintenance-free and performs its duty with certainty at all temperatures.

A particularly advantageous refinement of the drawroll unit is to provide at least two supports for the bearing with axial clearance from each other. A refinement of this type leads to very effective vibration damping, whereby the additional cost of construction is more than compensated by a very long service life.

It is further particularly advantageous when the body of interlaced wire is formed into an annular body which is arranged between the outer ring bearing and the housing. The removal and installation of the body of interlaced wire can then be executed in the simplest way.

Where the drawroll unit is formed with a cylindrical shell, an end wall and a rotatable shaft secured to the end wall coaxially of the shell to define a heatable annular chamber in the shell, additional balancing effects can be achieved whereby circumferentially distributed balance weights can be fitted on the axial limiting surfaces of the drawroll.

It is generally known that, because of the high operating speeds of drawrolls, balancing is essential in order to avoid further loading of the shaft bearings which anyhow have to take up considerable weight and vibratory forces in operation. These types of drawrolls are known. For example, the EP-PS 0 113 407 shows a drawroll with which a first balancing ring is fastened by means of two diametrically opposed screws to the end face of the drawroll facing away from the bearing position of the drawroll. The first balancing ring is fundamentally a circular disc in shape and with regard to necessary centering, lies in an indentation of the front end face and has a number of tapped holes for fitting balance weights, whereby the axes of the tapped holes are arranged to be coaxial to the axis of the drive shaft. A second balancing ring is located on the end of the drawroll remote from the outer end face, which is connected with the outer shell of the drawroll by a press fit, so that this is also centrally guided. Tapped holes are arranged in the second balancing ring, coaxially to the shaft axis in which balance weights can be fitted.

It is regarded as particularly less advantageous with these known drawrolls that two separate component parts (balancing rings) are required for balancing. Apart from this, the balancing rings must be manufactured precisely. In this way, the first balancing ring must be exactly correct with regard to the external diameter. In addition to this, an additional operation on the front of the drawroll is necessary, as the first balancing ring is only exactly centered when the balancing ring lies in the recess of the front end face with as little play as possible. Further, under workshop conditions, confusion of centering rings during maintenance cannot be excluded so that, in certain cases, the balancing ring can have a negative influence on the imbalance of the drawroll.

The manufacture and the assembly of the second balancing ring must be carried out with great care. Here, thermic problems must be taken into account, because, as a rule, the balancing ring is manufactured from light materials, e.g. aluminum, and for this reason, normally has a different coefficient of expansion from the drawroll material. Furthermore, special measures must be taken to prevent unwanted rotation of the second balancing ring.

Viewed generally, drawrolls of this known construction involve relatively higher manufacturing and assembly costs.

For this reason, the present invention has the task of meeting the need for a drawroll, which is simple in construction, with which the number of machine elements has been minimized and which can be balanced rapidly and simply. This task is accomplished, as the annular surface of the drawroll turned to the support position, is provided with tapped holes for receiving balance weights. With a refinement of this type, no special components must be provided for receiving the balance weights. The tapped holes are located in the drawroll itself, so that the total weight of the drawroll is not altered.

An advantageous further development of this embodiment is characterized by the fact that the end of the drawroll turned to the support position is formed with an annulus with tapped holes. Through this, the balancing of the drawroll on the end turned to the support position is particularly facilitated, as the balancing weights, also seen from the end wall of the drawroll, can be entered into the tapped holes. Advantages result regarding the total weight, when the holes in a second balancing ring are drilled through, but are provided with a thread for only a part of their length.

It is further advantageous and expedient when the annulus is allocated a larger external diameter than the drawroll. The annulus then raises the outer shell of the drawroll which, in turn, can be produced through a single turning operation. Thermal expansion problems are automatically eliminated through the use of identical materials.

A version which is exactly as simple and effective is achieved in that the tapped holes are closed on one side. In this way, whilst particles of dirt are excluded from the tapped holes, the balancing weights, which are for preference made as grub screws, are fixed after the assembly without additional help and without the possibility of getting lost.

The screwing in place of the balancing weights is completely problem free, in a simple and advantageous way, when the axes of the tapped holes are arranged at an acute angle to the axis of the drawroll, so that the appropriate screw driving tool, if necessary, can also be manipulated with the drawroll heating switched on.

In order to effect an axial closure of the drawroll unit, in particular for double shell drawrolls in filament processing having a heating unit, the front face of the end wall is provided with a rotationally symmetrical cover.

It is general practice with drawrolls to fit balance weights and thermometer probes on the side turned away from the support position, so that the front is freely accessible during the balancing process and for maintenance work on the thermometer probe. On the other hand, there is a desire to protect at least the thermometer probe from dirt and damage. This is mostly achieved by means of a cover which is screwed to the frontal area of the drawroll and which can be fitted on threaded studs for the total balancing after the balancing of the hollow roller and after the fitting of the thermometer probe on the front of the drawroll.

With a known type of closure, the cover consists of an aluminum disc, which is held on the front of the drawroll by means of two screws. The front of the drawroll is so formed with regard to the least possible deformation, so that the circumferential surface of the cover lies in a recess of the front and is held radially.

It is seen as less advantageous, with this known axial closure, that the demands made on the mechanical strength lead to a relatively thick cover, so that, even with the use of comparably light aluminum material, no noticeable weight saving appears. Aluminum has good thermal conductivity, so that inevitably, heat losses occur over the cover.

From the point of view of functional efficiency, production is difficult and therefore expensive, as the radial dimensions must be preserved as exactly as possible. Further, through the arrangement of the fastening screws, the assembly position can be erroneously turned through 180 degrees. Therefore, with simultaneous maintenance and adjustment on several drawrolls, it is possible that a cover can be fitted on a roller for which it was not intended, which can also lead to imbalance. Last but not least, every cover must be balanced separately before assembly and with the balancing, the weight distribution attained is only optimum for the correct assembly position and for a specific roller.

The task of the present invention in a subsidiary aspect is, therefore, to achieve a simple axial closure of the entry of the type mentioned, which is simple to manufacture and assemble, brings about the least possible imbalance, with minimum weight and which has no noticeable influence on the distribution of temperature on the surface of the drawroll.

According to this subsidiary aspect, the cover is concentric with the hollow roller. In this connection, it is particularly advantageous when the cover is formed as a sheet metal part with low heat conductivity and which has a central centering ring. In this way, the cover, for example, can be produced as a low cost, deep drawn part, practically as thin as desired and which already has very low heat conductivity because of the thin material. In an advantageous refinement a center ring of the cover is fixed radially through a recess in the frontal area of the drawroll. The centering ring is manufactured separately from the cover as a turned part and subsequently welded to the deep drawn cover, which is made from chrome steel. Thereby, the centering ring lies with a relatively small annulus on the front plate, so that only a very small heat loss takes place over the centering ring as well. Through the centering ring, the space between the face of the front side and the cover is divided into two spaces separated from each other, which also brings further pyrometric advantages.

A further advantageous development is that the cover lies with its outside circumference in resilient contact in the form of a circular line on the outer front face of the hollow roller. Through a linear contact, between the hollow roller and the cover, heat transfer between the hollow roller and the surrounding air will be made very difficult and the heat distribution on the surface of the roller is only influenced insignificantly. In spite of this, the ingress of particles of dirt and impregnation agents is effectively prevented.

A particularly simple assembly of the cover is achieved when the cover is connected by an axial screw connection with the front of the end wall. Alternatively, two or more screws can also be inserted. It is more advantageous when the cover is of such a nature which ensures that the desirable bearing load between the cover and the end wall is achieved by the elasticity of the cover alone.

In order to achieve correct rotation in the later operation of the drawroll, without incurring the slightest imbalance, it is conceivable and most simple in practice to balance the cover with the centering ring welded before assembly on the hollow roller of the drawroll.

For example, the cover is made from chrome steel. The cover can also be made from cheaper material when the surface of the cover is coated, for example with a material which is resistant against moisture or against impregnation by liquids used in filament processing.

The further subsidiary aspect relates to an arrangement for the simplification of the assembly of the drawroll unit and thereby to the avoidance of damage. This aspect provides a conical section on the shaft to fit into surface contact with a boss formed on the end wall.

It is generally known and customary to arrange the support of a galette on a drive shaft by a connection over a cone and an appropriately shaped boss on the end wall of the hollow roller and to screw this on the front plate of the frontal area of the shaft.

Even though the boss and the shaft can also be formed purely cylindrically, as a rule, a cone connection is chosen, which offers advantages on the grounds of accuracy. For example, a cone connection can be used, which is naturally free from play, achieves good truth of rotation, and which applies in every range of temperature.

However, with known galette units of this type of construction, e.g. as in U.S. Pat. No. 3,772,492, extreme care must be taken in the assembly in order to avoid damage to the cone. Even insignificant damage of the cone can upset the desired advantages, promote imbalance and vibrations and make the assembly difficult.

In this present case, the assembly on the front of the shaft is simply carried out and damage to the cone is almost impossible. To this end, the conical section of the shaft end is limited by two cylindrical sections, whereby the cylindrical end of the shaft furthest from the support position has a smaller diameter than the shaft in the area of the support position. In this way, on assembly, the cylindrical section of the drawroll is guided through the cylindrical section first, before the conical section comes into action. In an advantageous refinement, an anti-turning means is provided between the hollow cylinder and the shaft. With this, slipping of the cone is precluded in the simplest way and, in certain cases, receives the axial screw fastening between the shaft and the end wall. This screwed fastening should not be formed over the cylindrical guiding surface.

As already mentioned, the cone part must be very carefully produced, as even slight damage—apart from an undesired notch effect—can lead to noticeable imbalance. With regard to an assembly of the end wall on the shaft without damage, it advantageous to displace the cone in the direction of the support position, so that the conical section is about in the middle of the hollow roller.

With a refinement of this type, a bracing tube, on which the sheet packs of an inductor body rest within an inductor coil, is shortened and can no longer support the inductor body over its entire length. However, even with a shortened bracing tube, adequate stability is ensured.

This task is accomplished as the inductor body is made of sheets which are closely matched and connected with each other by welding seams. In this way, sheets with a high inherent stability result so that a shortened bracing tube can be used forthwith. This leads directly to a reduction of the total weight of the drawroll unit.

With a special refinement, the sheets of the inductor body are parallel to each other and radially displaced with each other. Consequently, the body has a certain number of sheets which are identical with each other which are held together with welding seams. With regard to the favorable magnetic characteristics, it has been shown that it is particularly advantageous to weld the inductor body laminations with each other on the front and inner sides. Such a construction of the sheets results in high pack density, which also leads to excellent conductance.

An advantageous refinement envisages that the ends of the sheets are received in grooves of a bracing tube, so that a lower magnetic reluctance exists between the parts named. Further, where the induction body consists of several sheets, these are arranged in the shape of a star around a bracing tube. Advantageously, the inductor coil is wound from an aluminum conductor material for reasons of functional efficiency and having regard to a total weight of the drawroll unit which is as low as possible. On the other hand, the sheets of the inductor body consist of steel sheets which have good magnetic conductance.

With a construction of this type, it must also be accepted that the various materials undergo different alterations in dimensions with alterations in the temperature, so that expansion joints must be provided in appropriate places between the inductor coil and the sheet packs.

Against this, the requirement exists that the inductor body, consisting of the inductor coil and the sheet pack, must be surely and firmly secured in the circumferential space of the galette, whereby this requirement exists at every possible operating temperature of the galette. To this end, the inductor coil is mounted to be insensitive to shaking, is firmly supported and expansion due to heat does not have any harmful effects. For example, the inductor coil is arranged resiliently in a circumferential space, both radially and axially. With a refinement of this type, alterations in the dimensions of the inductor coil through thermal expansion are taken up by supporting resilient elements. Relative alterations in dimensions between the inductor coil and the inductor body are then completely harmless. Consequently, through a support of the inductor coil of this type, the advantage exists that deformations in extension are taken up by the resilient elements. On the other hand, the additional advantage exists that the dimensions given for the inductor coil and for the inductor body need not be so precise. A relaxation of the requirements for dimensional accuracy make cheaper manufacture possible.

In an advantageous refinement, at least one axial ring surface of the inductor coil is supported on one or more resilient elements. With axial deformations in extension of the inductor coil, the adjacent resilient elements are more or less pressed together without the appearance of any harmful forces in the coil or in the adjoining machine parts.

It is particularly advantageous when a surface of the coil is supported on one or more resilient elements, so that dimensional alterations of the inductor coil through thermal expansion are compensated by the deformations in extension of the resilient elements and tensile stresses are effectively avoided.

If the inductor coil is suspended completely in the inner space of the galette, then in addition to every available advantage, a reliable mounting in the galette is also ensured. At the same time, the resilient elements serve as vibration dampers for the inductor coil, which largely precludes damage through shaking to the coil winding in the operation of the galette.

Constructively, it is particularly simple and advantageous when a cup spring with a central opening is used as a resilient element for the axial support of the inductor coil, which lies on the axial annular surface in a circular line. A uniform axial force is exerted on the inductor coil through a single resilient element. Any tilting of the coil is almost precluded.

A radial gap is provided between the inductor coil and the inductor body to fit resilient elements for the resilient support of the inductor coil in the radial direction. These resilient elements are preferably formed as spring plates and take up the radial expansions of the inductor coil forthwith and, at the same time, ensure a reliable mounting which is insensitive to shaking. Even though it would be theoretically sufficient to support the shell of the inductor coil by a single resilient element, in the preferred refinement, several resilient elements with constant angular distance from each other are brought into contact with the coil With regard to the central position of the inductor coil, it is particularly advantageous to install resilient elements as extended sheet metal strips, which are in contact with the coil over their entire length.

In a still further subsidiary aspect, an arrangement is provided for the measurement of the temperature between moveable machine elements, in particular for rotating double shell drawrolls in filament processing. In this arrangement, a temperature dependent measurement sensor is thermically coupled with the drawroll, which, through the drawroll and a stationary housing, limits a largely closed hollow space and in which the measuring sensor is permanently supported on the housing and extended into the hollow space.

Drawrolls of this type work, as is known, with relatively high rotational speeds with operating temperatures of up to 250 degrees Celsius. Having regard to the evenness of the end product, it is absolutely essential to acquire the temperature of the drawroll roller at any given time in order to be able to establish effective control of the drawroll heating.

For the measurement of the temperature of the drawroll when in operation, the installation is known of PT-100 resistances on the roller shell measurement sensor for example, which on their part, are installed in small tubes. The small tubes are led inwards radially on the front side of the drawroll and merge together in the center as one thick tube. The thicker tube protrudes into a hollow formed motor shaft and ends at the rear in a tri-axial plug. The plug coupling is fastened into the rotating part of the measured value transmitter, which rests on the rear shaft end. The stationary part of the measured value transmitter, the stator which operates purely inductively, is fastened on a fixed casing.

The measured value transmitter produces a frequency inversely proportional to the measured temperature. This electrical signal is transmitted to a regulator and to the correcting element. These types of measuring systems operate precisely and have been proved many times in operation. The construction of these measuring system is, however, relatively difficult and costly, as a result of the use of an inductive measured value transmitter.

An arrangement for temperature measurement is also known with which a shaft support of the shaft facing the front side of the drawroll is formed to a more or less extended radial groove on the supporting position of the shaft. Working together with an appropriately designed carrier body, a circumferential annulus results in this way, in which a stationary measurement sensor extends into the carrier body.

A construction of this type indeed has the advantage that an expensive measured value transmitter is unnecessary, but in the end, only a mixed temperature is measured, which is influenced by the normally very high temperature of the drawroll as well as by the relatively low temperature of the carrier. With this known arrangement, it is further seen as less advantageous that the measuring sensor installed for the acquisition of the temperature lies unprotected in the annulus and in the case of ingress of fibers into the annulus, can easily be damaged or destroyed.

The present invention provides a simple construction which is reliable in operation and which acquires the actual temperature of the drawroll as accurately as possible, at any given time.

The task according to this subsidiary aspect is accomplished, in that at least one closed groove for receiving a measurement sensor is formed in the shell of the drawroll. This groove is dimensioned in such a way that as to be practically completely filled by the measurement sensor. The open end of the groove is largely closed by a base carrying the measurement sensor, so that the measurement sensor is nearly exposed to the prevailing temperature and exclusively measures the temperature of the drawroll very accurately. The influence of disturbances, as, for example, the temperature of the housing and the ambient temperature is largely eliminated.

In a particularly advantageous refinement, the measurement sensor is extended as a stud or pin from a tubular base, whereby the cross section of the base is larger than the cross section of the groove. In addition, two protecting plates are formed on the base over the stud to define an air gap which partly mates with the groove in the drawroll. If the fibers being processed nevertheless enter into the annular groove, then the mechanical stress is taken by the firm tube material, so that damage to the relatively sensitive measurement sensor is precluded.

An advantageous further development of the measurement envisages that the stud extends beyond the axial front of the plates. The protection of the stud by the plates is only adequate for the protection of the stud so far as is necessary. The actual measurement sensor on the end of the stud is free of any protection and protected from damage by the drawroll groove itself, as the end of the stud with a small amount of axial and radial play mates with the groove. With an arrangement of this type, it is then possible to construct the stud in such a way that the thermal transit behavior is very favorable and temperature variations are acquired with a remarkably short delay time.

It is further particularly advantageous when the stud is thermically insulated against the base. This can be achieved in a simple way through a thermic insulation between the stud and tubular base. When a grouting with the appropriate characteristics is used, then any further mechanical fastening of the stud is unnecessary.

On the grounds of functional efficiency, it is particularly simple and advantageous when the groove has a square cross section. If the length of the stud is produced through a horizontal slot, then this results in excellent adaptation of the contours between the front of the stud and the bottom of the groove.

Where the galette has a stationary heating device arranged in an internal chamber and a temperature sensor is provided for the acquisition of the internal temperature of the galette, the gas found in the internal chamber heats up because of the stationary heating device and becomes turbulent through the rotation. Thus, a homogenous temperature results, which is detected by the measurement sensor extending into the inner chamber. The temperature prevailing on the measurement sensor, however, does not correspond exactly to the temperature of the shell, but rather corresponds to a mixed temperature, which is dependent on the temperature of all the adjacent parts in the inner space.

In order to avoid this problem and to measure the temperature of the shell of the galette with the required accuracy, at any time, an air current is produced by a pump along the heating device and the shell. The air current is carried past the temperature measurement sensor before leaving the galette. With a refinement of this type, the result is achieved that, in a simple and advantageous way, through the action of the pump when the galette is rotating, the surrounding air is sucked into the inner chamber which flows past the heating device and the shell and then flows past the temperature measurement sensor. Thus, the temperature on the measurement sensor largely corresponds to the temperature of the shell. At the same time, cooling of the heating device takes place. Thereby, from the viewpoint of construction, it is particularly simple and advantageous, when for the production of a pumping effect on the inside of the disc shaped front, radially formed impellers, which extend outwards, move through the inner chamber of the galette at the speed of the shaft. Advantageously, the inner chamber is connected with the atmosphere over an annular gap between the shaft and a bracing tube formed on the housing while an annular gap is formed between the surface of the shell and an annular shoulder of the housing through which a connection between the inner space and the atmosphere is produced. In this way, the air current is throttled, directly before leaving the galette.

With respect to an exact temperature measurement, the temperature measurement sensor is more advantageously arranged in the direction of the current directly before the annular gap. Further, it is envisaged that a throttle point is formed through an annular nose on the bracing tube, so that the air sucked in is limited in the inner chamber and the air current moves through the galette relatively slowly.

A galette unit, with a refinement of this type, has the result that the air current in the inner chamber flows through relatively slowly as a consequence of the throttle point. Thus, the heating device cools and the air current itself is warmed, so that the prevailing temperature on the temperature measurement sensor is not significantly altered. As a consequence of the throttle point, the quantity of air sucked into the inner chamber is low, so that impurities only reach the inner chamber in a corresponding measure. Because of the low speed of the air current, the current of air on the temperature measurement sensor acquires practically the same temperature as the shell. At the same time, the air flowing out of the galette prevents the ingress of foreign bodies into the inner space.

These and other objects and advantages of the invention will become more apparently from the following detailed description taken in conjunction with the accompanying drawings wherein:

FIG. 1 diagrammatically illustrates the critical speed ranges of a rotating element;

FIG. 2A schematically illustrates a cross sectional view of a drawroll unit constructed in accordance with the invention;

FIG. 2B illustrates a modified drawroll arrangement in accordance with the invention having a motor located outside a bearing housing;

FIG. 2C schematically illustrates a view of a drawroll unit having a motor contained within a housing in accordance with the invention;

FIG. 3 illustrates a cross sectional view of a drawroll unit constructed in accordance with the invention;

Referring to FIGS. 2A, 2B and 2C, a drawroll unit is essentially constructed of an element R which takes up the yarn (the "roller") and is mounted on a shaft W, so that these two elements together form a rotating part. In operation, this part is set in rotation by a motor M on the axis of the shaft W. The rotating part, in all three variants of the drawroll unit, is carried by a rolling bearing K (or some other suitable bearing) in a bearing housing or a casing G. The three variants differ only in the position of the motor with respect to the bearing.

In FIG. 2A, the motor (consisting of a stator on the casing G and the rotor on the shaft W) is located in the casing G between two rolling bearings.

In FIG. 2B, the motor is located outside the casing G an the motor shaft MW can be coupled with the roller shaft W via a coupling Ku.

In FIG. 2C, the shaft is extended outside the casing G and the motor M is directly fitted on the casing, so that the rotor (As in the variant in FIG. 2A) can again be arranged on the shaft W.

In all three variants, a vibration damping means D is fitted directly between the bearing K and the casing G. Through this, not only are the vibrations kept to a low level but this also applies to unbalanced bearing loads, which increases their working life.

Figure 4:
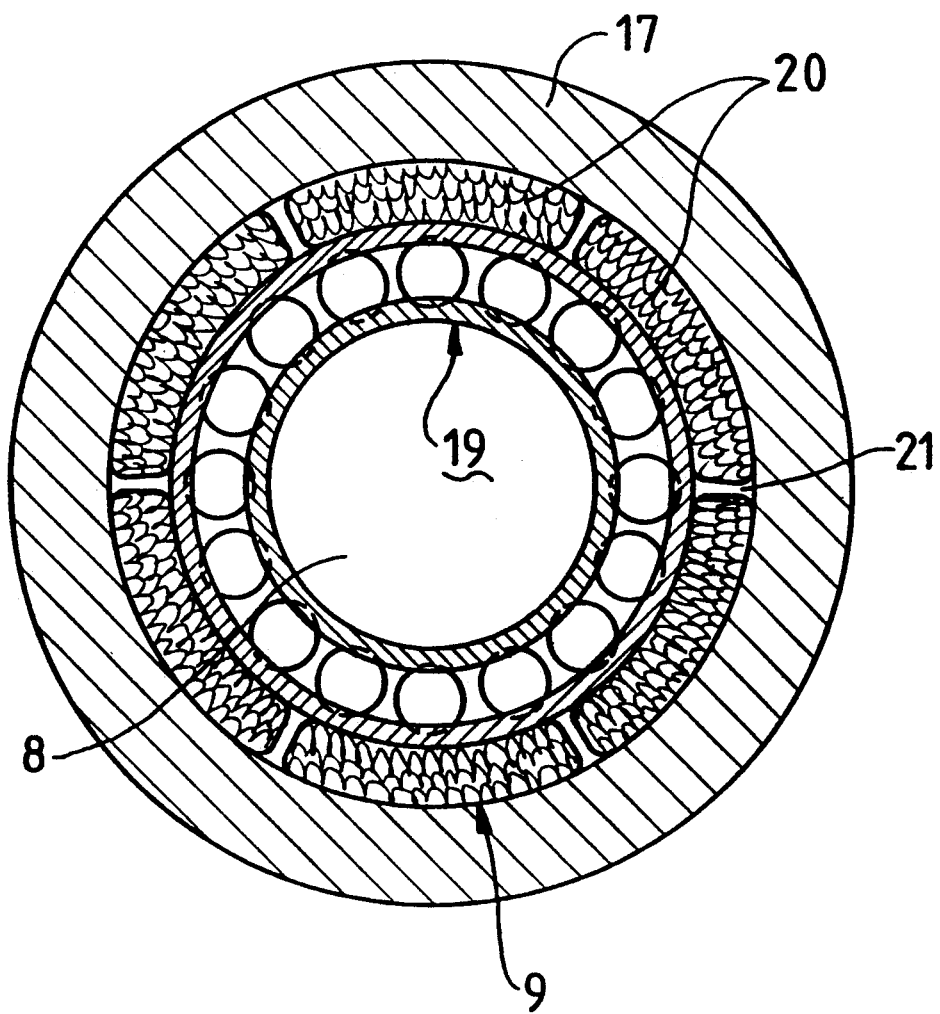
FIG. 4 illustrates a cross sectional view taken on line 4—4 of FIG. 3.

Referring to FIGS. 3 and 4, the drawroll unit includes a bearing housing 1 between a schematically shown galette 2 and an electric motor 3. In the bearing housing 1, there are in total four rolling bearings 4, 5, 6, 7 provided for the support of a shaft 8. There are two bearings in each case, 4, 5, and 6, 7 arranged parallel to each other and they are located in the end section of the bearing housing 1. The rolling bearings 4, 5, 6, 7 are supported radially in the housing 1 by vibration damping means in the form of a layer 9 of interlaced wire, so that radial vibrations in the operation of galette 2 are effectively damped.

The galette 2 consists mainly of a cylindrical shell 10, which is open on one side and, as viewed, the right hand end is closed through a disc-shaped end wall 11. There is a boss 12 formed on the end wall 11, with a conical end section 13 of the shaft 8 extending into this, whereby the shaft 8 is connected by a screw 14 axially with the end wall 11. A circumferential chamber 15 is formed by the cylindrical shell 10, the end wall 11 and the shaft 8 in which a stationary heating device 16 is located. The stationary heating device 16 is fastened on the casing 17 of the galette 2, which in turn, is connected by a flange to the bearing housing 1 by means of screws 18.

As indicated in FIG. 4, each bearing is in the form of a ball bearing 19 which is radially supported by a layer of interlaced wire 9, made up of several ring segments 20, with intermediate spaces 21 provided between the ring segments 20.

Particularly good results are achieved when the cross section of the ring segments 20 is square.

It is advantageous when the annular layer 9 is put together from several ring segments 20, so that damaged segments 20 can be exchanged individually for new parts. With a refinement of this type, the clearance spaces 21 between the ring segments 20 accommodate alterations in the dimensions due to extremely high temperatures.

Figure 5:
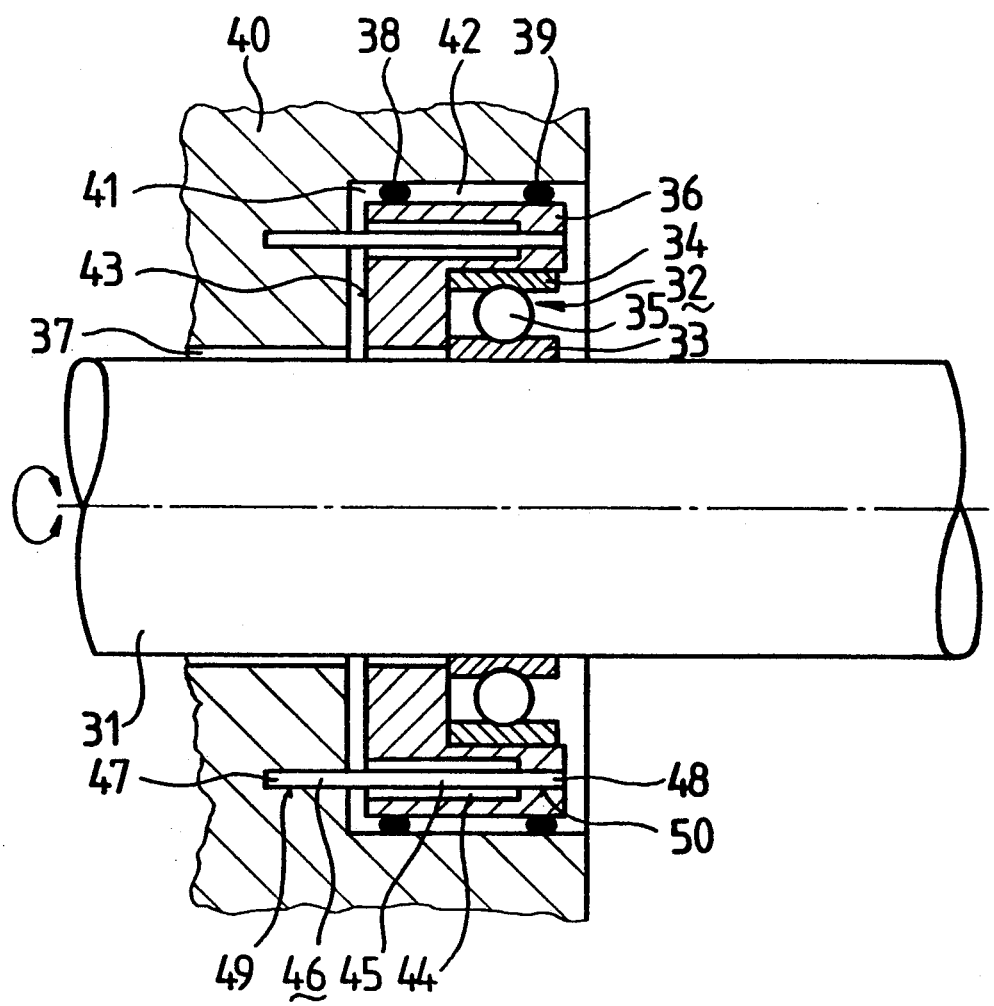
FIG. 5 illustrates a cross sectional view of a bearing mounting in accordance with the invention utilizing resilient pins.

Referring to FIG. 5, the drawroll unit may have a shaft 31 which, for example, can be set in rotation by an electric motor (not shown) whereby the direction of rotation of the shaft 31 is not of importance. A ball bearing 32 is fitted to the shaft 31, which principally consists of an inner ring 33, an outer ring 34 and the rolling elements 35.

The ball bearing 32 is fitted via a press fit in a bearing bush 36, which has, in the main, an L-shaped cross section, whereby the bearing bush 36 has such a diameter that a gap 37 exists between the bearing bush 36 and the shaft 31 and contact between the parts 31, 36 is precluded.

The outer limiting surface of the bearing bush 36 is supported by two O-rings 38, 39 on a housing or casing 40, so that a circumferential gap 41 exists between the outer radial limiting surface of the bearing bush 36 and the casing 40.

The two O-rings 38, 39 are arranged in a prescribed radial spacing from each other, whereby a circumferential annulus or chamber 42 exists, which, for example, is connected with a source of pressure oil (not shown). For this purpose, suitable drilled holes (not shown) are provided in the casing 40.

In the practical example shown, there is also a gap present on the left front plate 43 of the bearing bush 36 and the casing 40. A circumferential groove 44 emanates from this front plate 43 and receives resilient means, such as a plurality of circumferentially disposed spring pins 46. Each spring pin 46 has a middle area 45 spaced from the walls of the groove 44 while the ends 47, 48 of the pin 46 are anchored in the casing 40 and the bush 36, whereby the spring pin 46 for example, is coaxial with the shaft 31. Drilled holes 49, 50 are provided for anchoring the ends 47, 48 of the spring pin 46 in press-fit manner in the casing 40 and in the bearing bush 36. Instead of the circumferential groove 44, a blind hole can also be provided in the bearing bush 36 for each pin 46. For better utilization of the resilient characteristics of the pins 46, the middle section of each spring pin 46 lies with radial play in the grove 44 the bearing bush 36.

In this connection, it is particularly simple and advantageous when the casing 36 is provided with a circumferential groove 44 as such a groove is simple to manufacture. However, the provision of a drilled hole in the bearing bush 36 for receiving each spring pin 46 may be considered as an alternative, with the free area of the pin lying in the hole so that, with relative movements between the bearing bush 36 and the casing 40, hammering of the pins 46 in the bearing bush 36 is prevented.

It is an advantage when the several spring pins 46 are anchored in the bearing bush 36 at regular angular distances.

Fundamentally, the cross section of the bearing bush 36 can have an L-shape cross section, so that the bearing 32 can be assembled without problems and, when installed, has a relatively large surface exposed to the ambient temperature, whereby considerable advantages exist with regard to cooling.

In the operation of the unit described according to FIG. 5, if the shaft 31 does not run true, the vibrations of the shaft 31 will be transmitted to the bearing bush 36. The O-rings 38, 39, the spring pins 46 and the pressure oil enclosed in the circumferential annular space 42, indeed ensure that the only vibrations transmitted to the casing 40 are considerably damped. The running of the shaft 31 is generally smoothed whereby reduced stress appears on the bearings.

Figure 6:
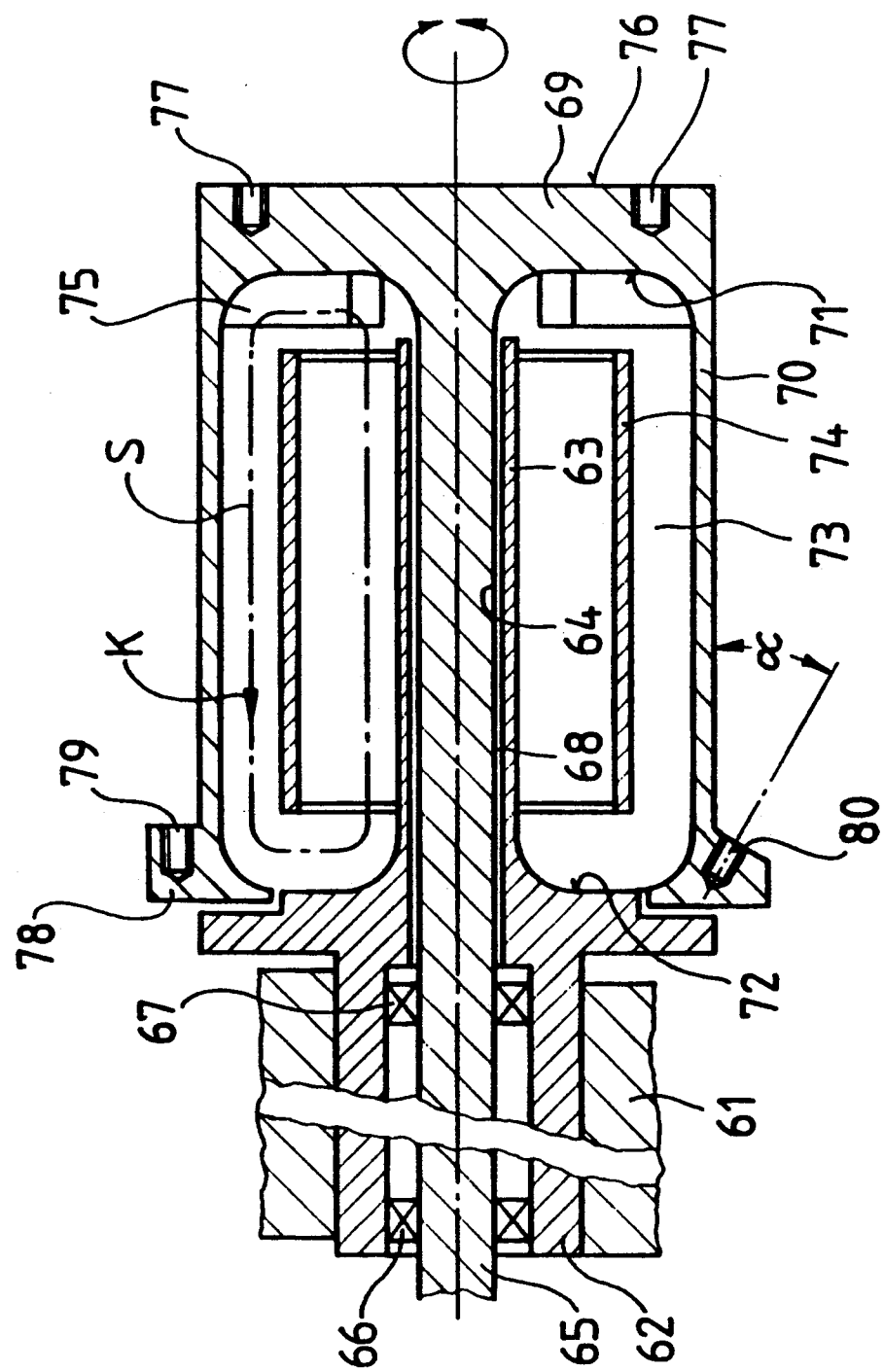
FIG. 6 illustrates a cross sectional view of a galette having balancing means at opposite ends of a shell in accordance with the invention.

Referring to FIG. 6, a simplified galette may be constructed of a stationary casing 61 which is connected to a rotationally symmetrical carrier body 62. A carrier arm 63 is formed on the carrier body 62 in the axial direction of the galette which is provided with a central bore 64. A shaft 65 is inserted through the bore 64 and is journalled in the carrier body 62 by two bearings, 66, 67.

A gap 68 exists between the radial inner bounding surface of the carrier arm 63 and the shaft 65 which prevents any contact between the arm 63 and shaft 65.

The end of the shaft 65 remote from the bearings 66, 67 is formed as an end wall 69 extending outwards, on the circumference of which a roller shell 70 is formed. The roller shell 70 together with the end wall 69 forms a hollow cylinder which is open at one end, through which the centrally arranged shaft 65 is set in motion.

An inner front end 71 of the end wall 69, the roller shell 70, a front wall 72 of the carrier body 62 and the carrier arm 63, limit an annulus or chamber 73, in which a heating device 74 is arranged. In the operation of the galette, the shaft 65 is set in rotation when the heating device 74 is switched on, so that, through impellers 75 on the end wall 69 in the chamber 73, a current of warm air or of gas is started which moves along the dash dotted line S in the direction of the arrow K and which heats the roller shell 70 to the working temperature desired at the time.

The external surface of the end wall 69 is provided with circumferentially distributed tapped holes 77, in which balancing weights, (not shown) can be fitted. The tapped holes 77 lie coaxially to the shaft 65.

The left hand end of the roller shell 70, as shown, has a radial collar 78 with a larger diameter which has tapped holes 79, 80, again provided for fitting balancing weights. Whilst the tapped holes 79 shown in the upper part of FIG. 6 are, as an example, arranged axially to the shaft 65, the axes of the tapped holes may subtend an acute angle $\alpha$ with the axis of the shaft as shown in the lower part of FIG. 6.

Figure 7:
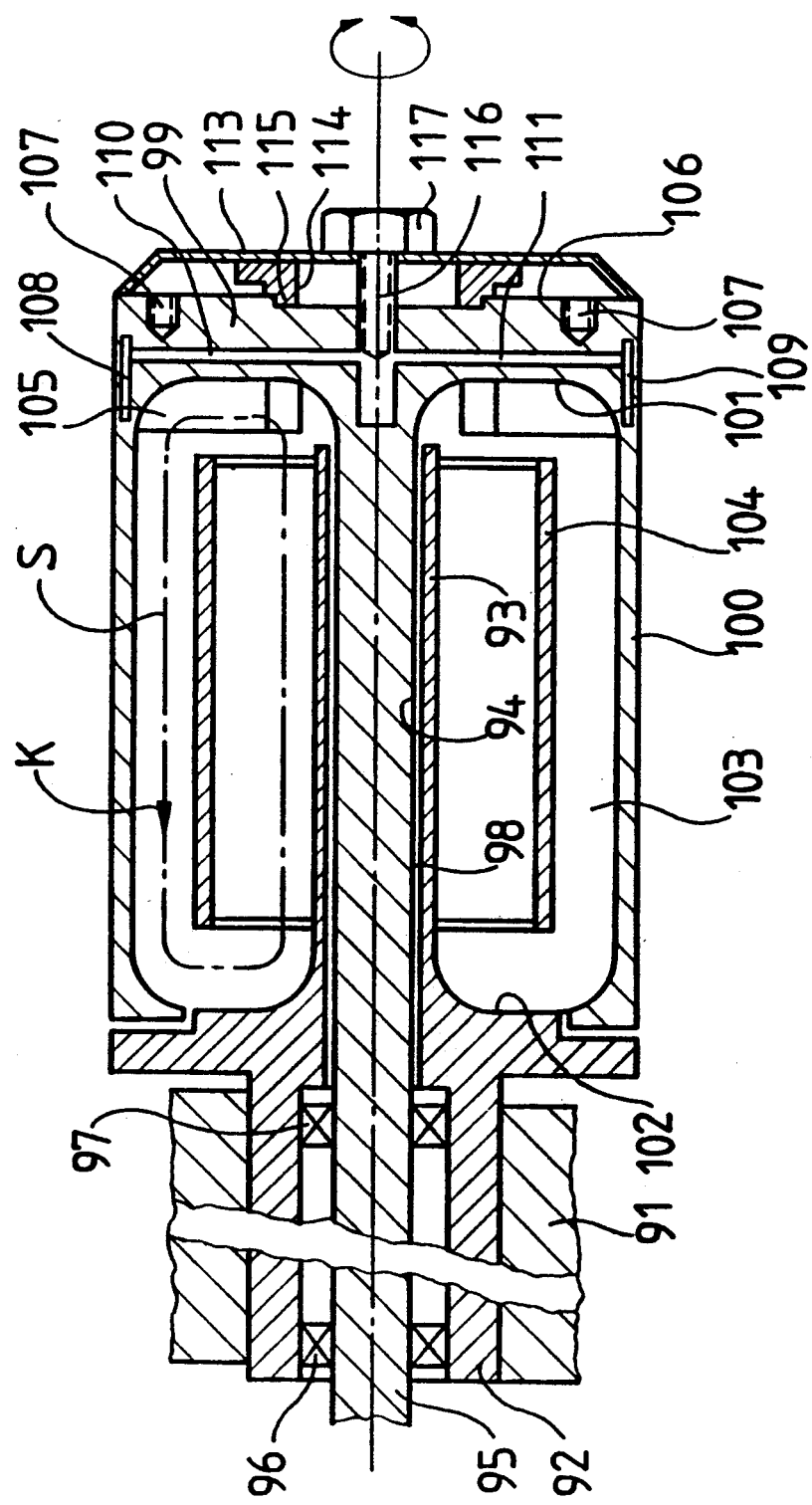
FIG. 7 illustrates cross sectional view similar to FIG. 6 of a galette having a closure cover constructed in accordance with the invention.

Referring to FIG. 7, wherein like reference characters indicate like parts as above the galette may also be constructed with a stationary casing 91 connected to a rotationally symmetrical carrier body 92. As above, a carrier arm 93 extends from the body 92 in the axial direction of the galette and is provided with a centrally bored hole 94. A shaft 95 is passed through the bore 94 and is connected with the carrier body 92 via two bearings 96, 97. A gap 98 exists between the radial inner bounding surface of the carrier arm 93 and the shaft 95 to prevent any contact.

The end of the shaft 95 opposite to the bearings 96, 97 is formed as an end wall 99 extending outwards to a roller shell 100. The roller shell 100, together with the end wall 99, forms a hollow cylinder which is open at one end and which is set in motion through the centrally arranged shaft 95.

An inner front end 101 of the end wall 99, the roller shell 100, an end face 102 of the carrier body 92 and carrier arm 93, limit an annular chamber 103 in which a heating device 104 is arranged.

The external surface 106 of the end wall 99 is provided with circumferentially distributed tapped holes 107, in which balancing weights (not shown) can be fitted. The tapped holes 107 lie coaxially to the shaft 95.

For the measurement of the surface temperature of the drawroll in operation, there are two measurement sensors 108,109 (e.g. PT 100-resistances) in the roller shell 100, which for their part are built into small tubes or bores 110, 110. The small bores 110, 111 are guided into the end wall 99 in the drawroll and unite in the center as one larger bore 11 which is placed in the hollow bored shaft 95 and ends at the rear part in a triaxial plug (not shown).

The end wall 99 also carries a cover 113, which is formed as a rotationally symmetrical sheet metal part. The cover 113 has a central centering ring 114, which is produced separately from the cover 113 as a turned part and both parts are welded together on the cover 113 after manufacture. Through the centering ring 114, the space between the front face 106 of the end wall 99 and the cover 113 is divided into two spaces 118, 119, separate from each other. The centering ring 114 is fixed to the end wall 99 through a cut-out 115 and the cover 113 is connected to the end wall 99 through an axial screw connection 116, 117.

The cover 113 is formed as a sheet metal part with low heat conductivity and is made as thin as desired. For example, the cover 113 may be made of chrome steel which may or may not be provided with a suitable coating to resist moisture. As indicated, the cover 113 closes over the holes 107.

As previously noted, the outer periphery of the cover 113 is held in resilient contact with the face 106 of the end wall 99. Because of the linear contact between the cover 113 and the end wall 99, heat transfer will be very difficult and the heat distribution on the surface of the shell 100 will only be influenced to an insignificant amount. Further, the resilient contact of the cover 113 on the end wall 99 will preclude the ingress of particles of dirt and impregnation agents.

Figure 8:
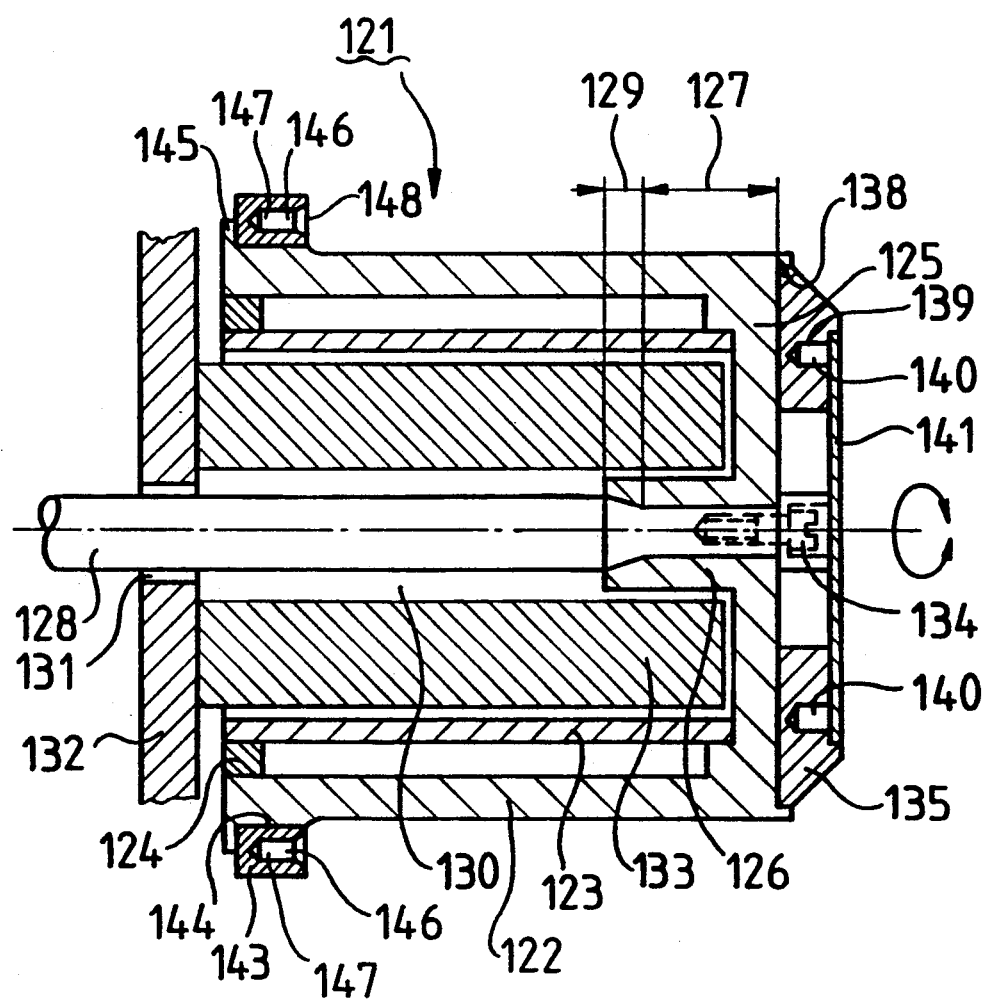
FIG. 8 illustrates a modified galette having a simplified heating unit in accordance with the invention.

Referring to FIG. 8, a galette 121 may be constructed in a manner so as to facilitate assembly of the components of the galette without damage to the components. To this end, the galette 121 includes a cylindrical outer shell 122 to which an internal cylindrical sheet 123 is arranged coaxially. The shells 122, 123 are held apart with a desired clearance through an annular insert 124 and are held together through a common disc shaped end wall 125. The central area of the end wall 125 is formed as a boss 126, which not only carries a cylindrical end section 127 of a shaft 128 but also a conical section 129 of the shaft. The cylindrical end section 127 of the shaft 128 forms a clearance fit with an appropriate inner surface of the boss 126. Further, the boss 126 has a conical section which fits with the conical section of the shaft 128.

A hollow roller is formed, closed on one side, by the shells 122, 123 and the disc shaped end wall 125 in which the shaft 128 is arranged centrally, whereby the shaft 128 extends through an internal chamber 130 of the hollow roller and an opening 131 in a machine frame 132 to a support (not shown). A stationary heating device 133 is fastened to the machine frame 132 and extends axially into the cylindrical internal chamber 130 between the shell 123 and the shaft 128. The end wall 125 is fastened to the cylindrical end section 127 of the shaft 128 by means of a screw 132.

A first balancing ring 135 is fastened to the end wall 125 with screws (not shown) which are guided in tapped holes. A cylindrical indentation 138 in the end wall 125 serves for the centering of the balancing ring 135.

The balancing ring 135 is provided with tapped holes 139 for the fitting of the balancing weights 140 as well as a cover plate 141 for covering the tapped holes 139. This cover plate 141 is fastened by means of two screws (not shown) on the balancing ring 135 which thread into tapped holes in the first balancing ring. A second balancing ring 143 is provided on the machine frame end of the outer shell 122. The second balancing ring 143 is press fit on a cylindrical surface 144 of the outer shell 122 and butted against a web 145 extending from the shell 122. For protection against turning, the balancing ring 143 has a nose (not shown) facing the machine frame 132 which fits in a cut-out (not shown) of the web 145. The ring 143 has tapped holes 146 for the fitting of threaded balance weights 147 such as grub screws.

A cover 148 is inserted in the balancing ring 143 for covering the tapped holes 146 and is fastened by means of two screws (not shown). Tapped holes are provided in the second balancing ring 143 for fitting the screws. The balancing ring 143 is centrally guided on the outer shell 122 due to the press fitting of the balancing ring 143 on the outer shell 122.

Figure 9:
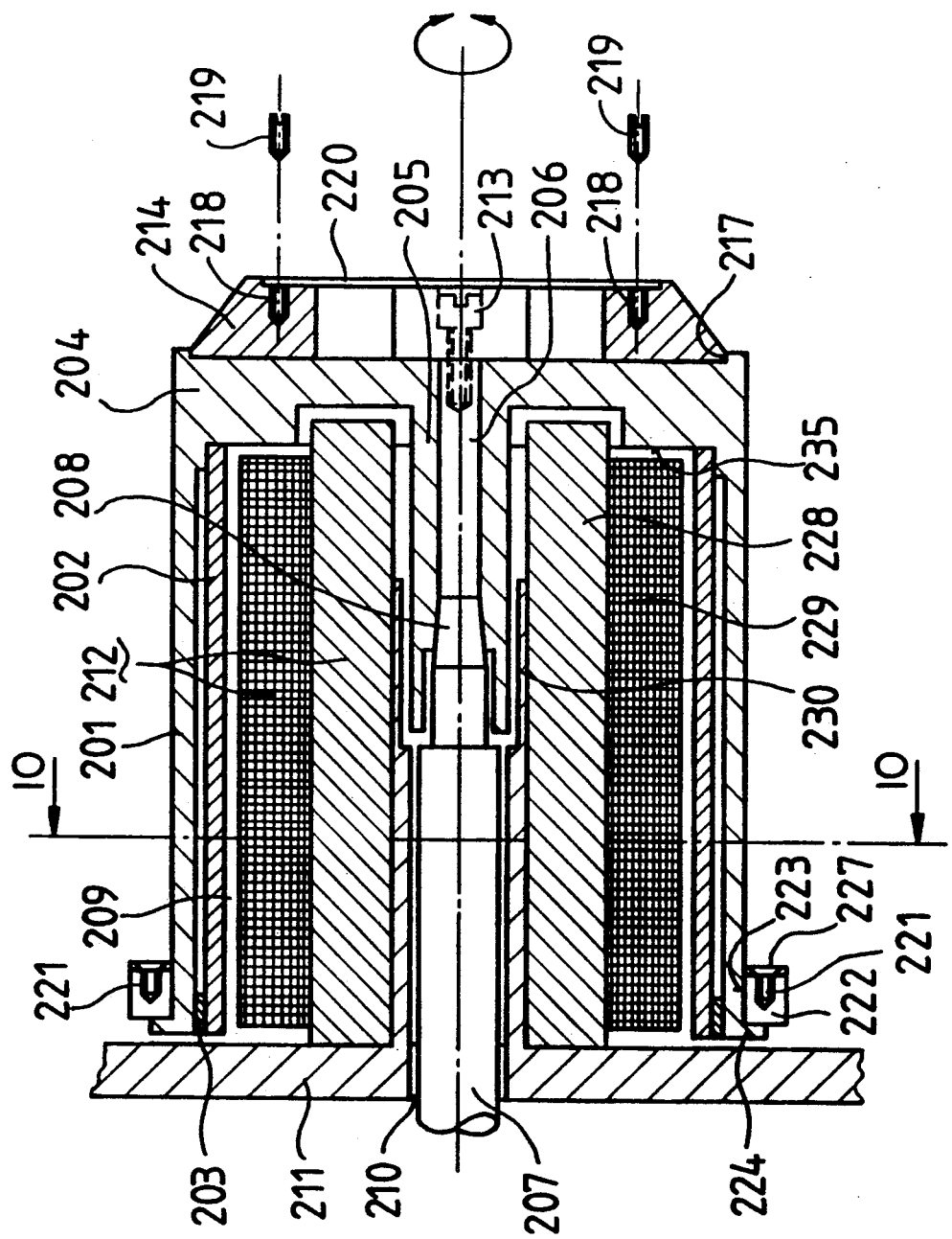
FIG. 9 illustrates a cross sectional view of a galette having a closure cover which includes a conical section constructed in accordance with the invention.
Figure 10:
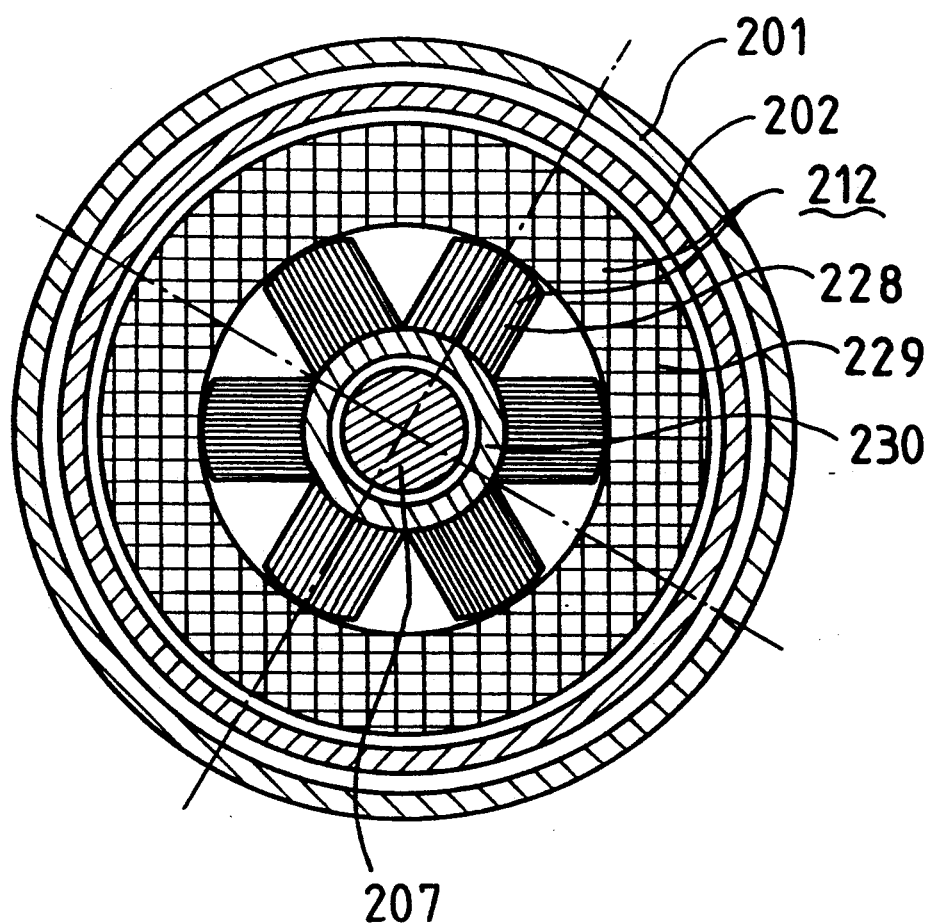
FIG. 10 illustrates a view taken on line 10—10 of FIG. 9.
Figure 11:
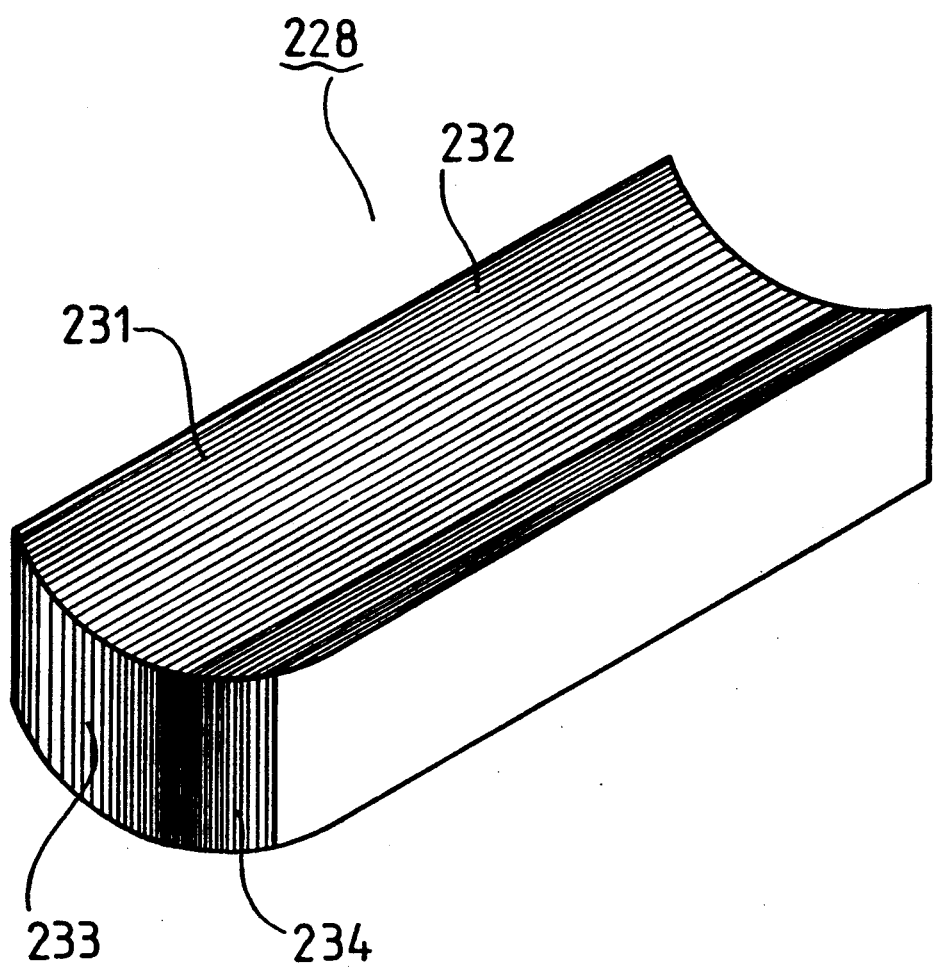
FIG. 11 illustrates a perspective view of an inductor body in accordance with the invention.

Basically, FIGS. 3, 4, and 5 show two embodiments which can be of use in the main aspect of balancing and damping the vibrations in a drawroll unit. FIGS. 6 to 8 show a subsidiary aspect which can be used in a unit according to the other aspects. The combination of all these subsidiary aspects with the main aspect results in an effective and advantageous structure. The following embodiments are specifically for galettes which can be heated. In FIGS. 9 to 11 the appropriate parts are provided with the same designation numbers.

Referring to FIG. 9, the galette has a cylindrical shell 201 which is arranged coaxially with an inner cylindrical shell 202, whereby the shells 201, 202 are held at the desired radial clearance from each other by an annular insert 203. The shells 201, 202 are connected together through a common disc-formed end wall 204 with a central area of the end wall 204 formed as a boss 205, which not only carries a cylindrical end section 206 of a shaft 207 but also a conical section 208.

A hollow roller is formed, closed on one side, by the shells 201, 202 and the end wall 204 in which the shaft 207 is arranged centrally, whereby the shaft 207 extends through an internal chamber 209 of the hollow roller and an opening 210 in a machine frame 211 to a support (not shown). A stationary heating 212 device is fastened to the machine frame 211 and extends axially into the cylindrical chamber 209 between the shell 201 and the shaft 207. The end wall 204 is fastened to the cylindrical end section 206 of the shaft 207 by means of a screw 213.

A first balancing ring 214 is fastened to the end wall 204 with screws which are inserted in tapped holes. A cylindrical indentation 217 on the end wall 204 serves for the centering of the balancing ring 214. This balancing ring 214 is provided with tapped holes 218 for fitting balancing weights 219. A cover plate 220 is fastened by means of two screws (not shown) on the balancing ring 214 for covering the tapped holes 218.

A second balancing ring 222 is a press fit on a cylindrical surface 223 of the outer shell 201 and is secured against a web 224. For protection against turning, the balancing ring 222 has a nose (not shown) facing the machine frame 211 which fits in a cut out (not shown) provided in a web 224. The tapped holes 221 in the balancing ring 22 serve for fitting balance weights 227 provided with a thread.

A cover 227 is inserted in the balancing ring 22 for covering the tapped holes 221 and is fastened to the ring 222 by means of two screws (not shown). Tapped holes are provided in the balancing ring 222 for fitting the screw. The second balancing ring 222 is centrally guided on the outer shell 201 by the press fitting of the second balancing ring 222 on the outer shell 201.

The stationary heating device 212 consists of inductor bodies 228 and an induction coil 229, whereby the bodies 228 are arranged on a bracing tube 230.

As indicated in FIG. 10, the inductor bodies are peripherally spaced about and on the tube 230 at the same angular distance to each other. According to FIG. 9, the end faces of the bodies 228 turned away from the machine frame 211 lie in slots 235 of the cylindrical end wall 204.

Referring to FIG. 11, each inductor body 228 is in the form of a sheet pack 228 consisting of numerous single plates 234, which are connected underneath each other by welding seams 231, 232 on the inside and welding seams 233 on the front. The plates 234 are arranged with each other in such a way, that, through radial staggering of the outside and insides of the sheet pack, they have the same radii.

Figure 12:
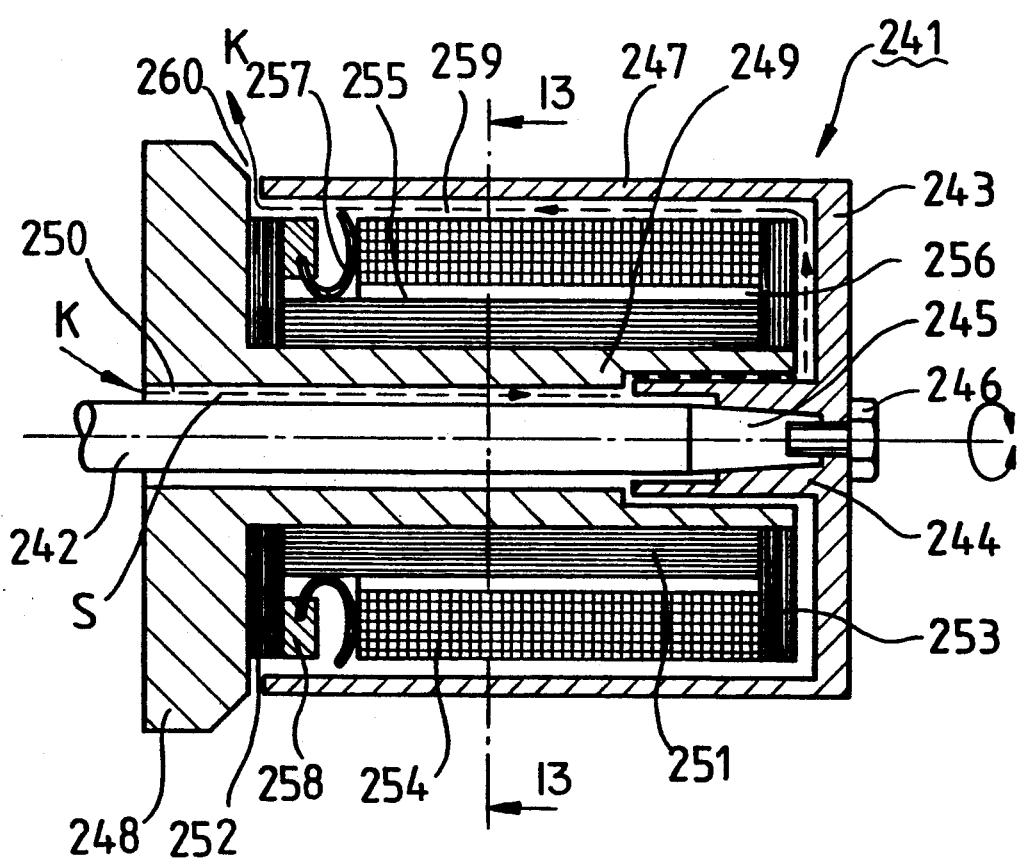
FIG. 12 illustrates a view of a modified heating unit having a resiliently mounted inductor coil in accordance with the invention.
Figure 13:
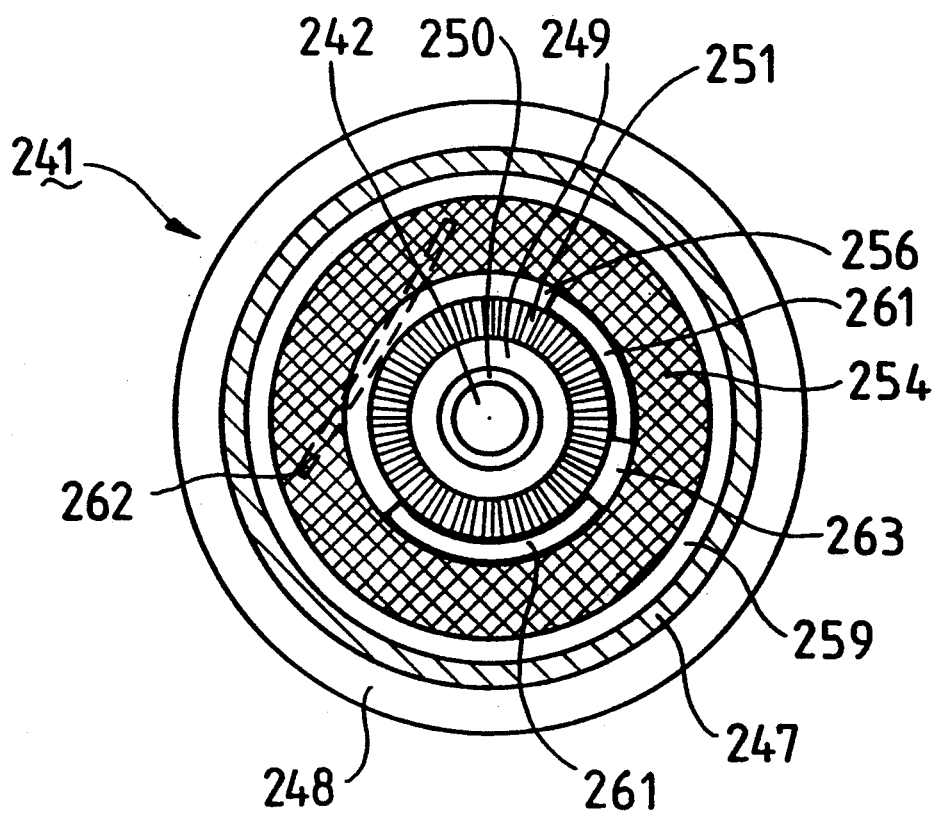
FIG. 13 illustrates a view taken on line 13—13 of FIG. 12.

Referring to FIGS. 12 and 13, a galette 241 may be constructed such that the inductor coil is insensitive to shaking (vibrations) and is able to accommodate heat expansion. To this end , the heatable galette 24, as above, has an end wall 243 fastened to a shaft 242 via a central boss 244 formed on the end wall 243. A conical section 245 of the shaft 242 extends into the boss 244 and is held by means of a screw 246. The shaft 242 is secured to the end wall 243 by a screw 246 and can be set in rotation by means of an electric motor (not shown).

The radial outer area of the end wall 243 is continued into a shell 247, as above, to form a hollow roller.

The galette 241 is also connected to a support arrangement (not shown) over a carrier body 248, whereby the carrier body 248 has a hollow cylindrical carrier arm 249. The shaft 242 and affixed boss 244 are located in the carrier arm 249 with a radial gap 250 between the shaft 242 and arm 249.

An inductor body 251 is arranged on the circumferential surface of the carrier body 249, which is formed from numerous radial plates or sheets. The sheets of the inductor body 251 extend in the longitudinal direction over the whole of the carrier arm 249 and lie with their ends on inductor flanges 252, 253, which are again assembled from single magnetically conducting sheets. The sheets of the inductor flanges 252, 253 stand vertically to the sheets of the inductor body 251 and extend radially outwards as far as the cylindrical shell 247. Air gaps between the shell 247 and the ends of the inductor flange 252, 253 are kept as small as possible.

The inductor body 251 which is mainly circular in shape is surrounded by the circular inductor coil 254. The dimensions of the inductor body 251 and inductor coil 254 are so chosen that a clearance 255 is formed therebetween in which resilient elements 256 are so arranged, that the inductor coil 254 is resiliently held at a radial clearance to the inductor body 251. If various expansions of the bodies 251, 254 appear as a result of temperature variations, then these alternations of dimensions are taken up forthwith by the resilient elements 256. The resilient elements 256 are thereby more or less pressed together, whereby the radial clearance alters between the bodies 261, 252.

As shown in FIG. 12, the left hand end of the inductor coil 254 is acted on by a resilient element 257 mounted in a clamp body 258 which is firmly fixed, for example, on the inductor flange 252. The resilient element 257 is biased against inductor coil 254 and alters this form and tension depending on the expansion of the coil 254.

In the operation of the galette according to FIG. 12, the shaft 244 is rotated and the inductor coil 254 is connected to an alternating current, so that a magnetic flux results in the inductor body 251 and in the inductor flanges 252, 253, through which turbulence results in the shell, which finally results in the heating of the shell 247. Subject to the surface roughness of the internal limiting surfaces 258 of the disc shaped end wall 243 a pumping effect subsequently results in the inner space of the galette 241 along the dotted line S. The heated air flows through the annular slot 259 and finally leaves the galette 241 through an annular opening 260.

In the operation of the galette 241, load changes, rotational speed alterations and unbalanced vibrations exist which are only passed in a considerably damped state to the inductor coil 254 and which cannot cause damage in any case.

Referring to FIG. 13, in a simplified galette 241, the resilient elements in the clearance 255 are formed as spring plates 261, 262 whereby one spring plate 262, is shown in a tension free state. Interspaces 252 are also provided for thermic considerations between the spring plates 261, 262.

Figure 14:
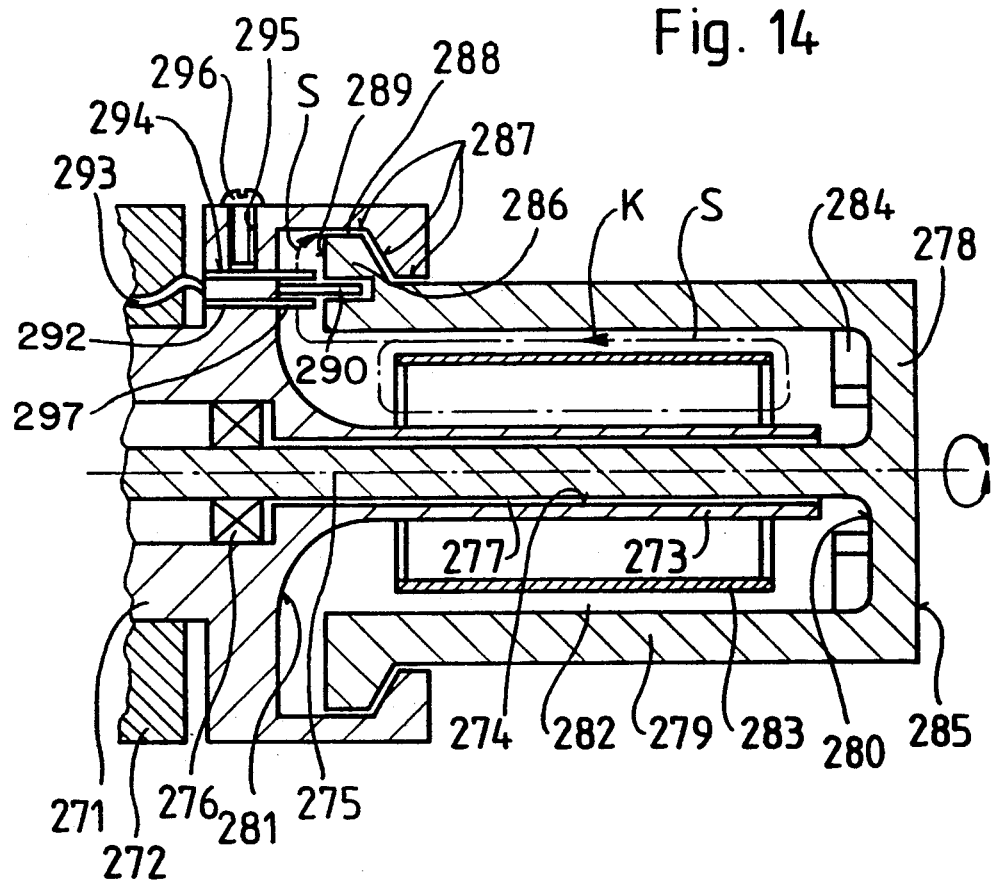
FIG. 14 illustrates a modified galette having a temperature measuring sensor in accordance with the invention.
Figure 15:
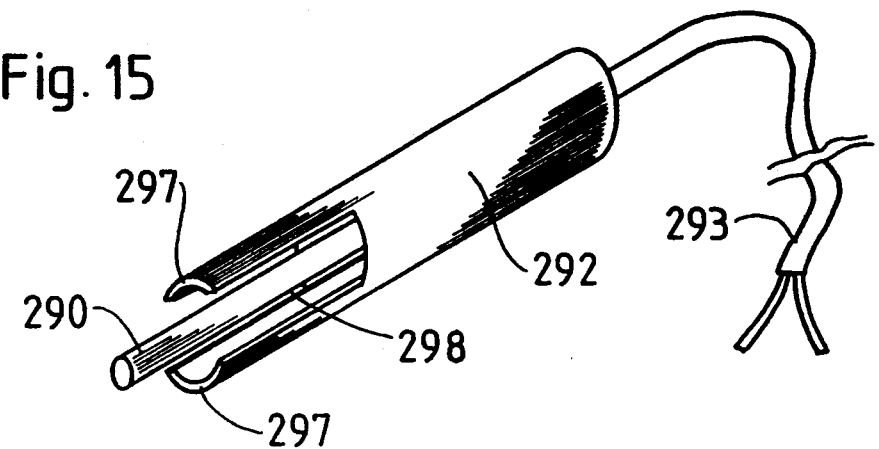
FIG. 15 illustrates a perspective view of the temperature sensor in accordance with the invention.

Referring to FIGS. 14 and 15, in order to acquire the temperature of the drawroll roller (shells) at any time, the galette 27 is provided with a temperature measurement sensor between the housing and the rotatable shell. For example, the galette has a stationary housing 272 and is mounted in a rotationally symmetrical carrier body 271 from which a carrier arm 273 projects in the axial direction of the galette. The arm 273 is provided with a central bore 274 through which a shaft 275 passes into a bearing 276 in the carrier body 271.

A gap exists between the inner bounding surface of the carrier arm 273 and is shaft 275, which prevents any contact between the parts.

The end of the shaft 275 is formed as a radial end wall 278 which extends outwards into a roller shell 279. The roller shell 279 with the end wall 278 forms a hollow cylinder, open on one side, which can be set in motion with the centrally arranged shaft 275.

An inner front wall 280 of the end wall 278, the roller shell 279, a wall 281 of the carrier body 271 and the carrier arm 273 limit an annular chamber 282, in which a heating unit 283 is arranged. In the operation of the galette, the shaft 275 is set in rotation when the heating unit 283 is switched on so that, through impellers 284 in the annular chamber 282, a current of warm air or some other gas is started which moves along the dash dotted line S in the direction of the arrow K and which heats the roller shell 279 to the working temperature desired at the time.

The left hand end of the roller shell 279 is extended radially, whereby an annulus 286 forms a gap with appropriately shaped surfaces 287 of the carrier body 271 through which a partial current of air flows out of the annular chamber 282 according to the dash-dotted line S into the open air. The axial front face 289 of the annulus 286 is provided with a groove with a square cross section to receive a spring pin or stud 290 which form a temperature sensor together with a tube shaped base element 292. The temperature sensor has connecting leads 293 and lies in an axial bore 294 of the carrier body 271. The base element 292 is fastened in place by a screw 296 inserted in a tapped hole 295 of the carrier body.

As shown in FIG. 15, the temperature sensor 290, 292 has two protecting plates 297 projecting from the base element 292 whereby the plates only half surround the stud 290. An air gap 298 is formed between the plates 297 and the stud 290. The section of the base element 292 turned towards the connection 293 is filled with an insulating means (now shown) which acts as thermal insulation as well as the mounting for the stud. Additional insulation can be fitted outside on the base element 292.

Referring to FIG. 14, the stud 290 projects in the groove while the base element 292 and, particularly, the plates 297, largely close off the groove so that the stud 290 exclusively measures the temperature of the drawroll shell 279 very accurately. The cover plates for protecting plates 297 thus serve to largely eliminate the influence of any distrubances, for example from the carrier body 271 and the ambient temperature.

Figure 16:
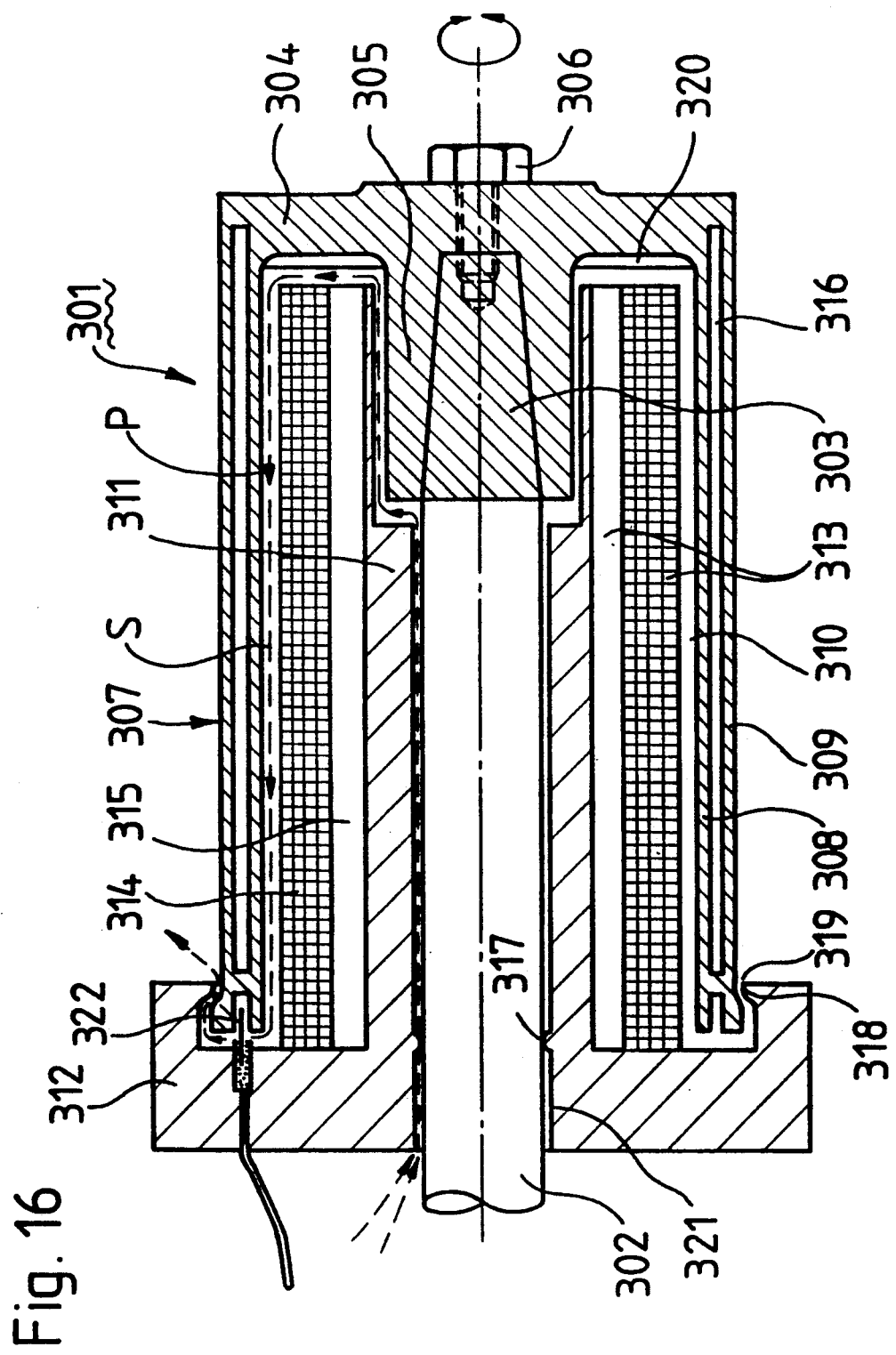
FIG. 16 illustrates a modified galette having flow passages therethrough for cooling a heating unit.

Referring to FIG. 16, the galette may be constructed to further ensure that the air current passing over a temperature measurement sensor has practically the same temperture as the shell. To this end, the galette 301, as above, has a rotatable shaft 302 which is coupled to a support arrangement such as an electric motor drive (not shown) and which has a cone shaped section 303 fitted into a boss 305 of an end wall. The shaft 302 is connected to the end wall 304 by means of a screw 306.

A shell 307 is formed on the end wall 304 and consists of an inner roller shell 308 and an outer roller shell 309. The shell 307 extends coaxially to the shaft 302 to form an annular chamber 310 with the shaft 301, end wall 304 and shell 307 in which an annular heating unit 313 is arranged, for example on a bracing tube 311. The bracing tube 311 is a component part of a carrier body 312 which receives the shaft 302 with a small amount of radial free play.

The stationary heating unit 313 consists of an inductor body 315 mounted on the bracing tube 311 which is preferably constructed as a sheet pack. An inductor coil 314 surrounds the sheeted inductor body 315, which is, for example, wound from a relatively thick aluminum conductor. A narrow circumferential space 316 is formed between the inner roller shell 308 and the outer roller shell 309 in which there is a volatile liquid.

An annular nose 317 is formed on the tube 311 in facing relation to the shaft 302, whilst an annular shoulder 318 on the carrier body 312 forms an annular gap 319 with the circumferential surface of the roller shell 309. Air impellers 320 are formed on the inside surface of the disc shaped end wall 304 which, during rotation of the shaft 302, causes a current of air, shown by the dash-dotted line S in the direction of the arrow P.

During operation, the surrounding ambient air enters the annular gap 321 between the carrier body 312 and the shaft 302 in the galette 301 and flows through the annular nose 317 pasted the entire length of the heating unit 313 to a temperature sensor 322, which is permanently situated in the carrier body 312 and is a PT-100-resistance, for example. The temperature of the heated air current is measured before the ir current is throttled again and leaves the galette 301 through the annular gap 319. The air which is sucked in, flows directly into the free air and not through the support for the shaft 302—in this way there is no contamination of the lubricant.

While the relatively slow low air current moves past the stationary heating unit 313, and is thereby heated, the medium enclosed in the circumferential annular chamber 310 ensures an even temperature on the entire length of the shell 307 through evaporation and condensation processes.

The invention thus provides a drawroll unit of reduced costs and of balanced construction.

In addition, the invention provides a drawroll unit which can be assembled in a simple manner from a minimum number of parts.

Still further, the invention provides a drawroll unit with a heated galette of reduced weight.

The invention further provides for a relatively simple technique for controlling the temperature of a heated galette of a drawroll unit.

What is claimed is:

1. A drawroll unit comprising
   a heatable galette having a cylindrical shell and a rotatable shaft concentrically within and connected to said shell;
   an electric motor drivingly connected to said shaft for driving said shaft within a first predetermined speed range up to a limiting speed at which damage occurs in a short time period;
   a housing between said galette and said motor;
   a pair of axially spaced bearings rotatably supporting said shaft in said housing;
   vibration damping means between each bearing and said housing for damping vibrations of said shaft in said housing occurring within a second speed range within said first predetermined speed range, said vibrations being of a nature to otherwise cause damage over a long time period.

2. A drawroll unit comprising
   a cylindrical shell;
   an end wall integral with one end of said shell;
   a rotatable shaft secured to said end wall coaxially of said shell to define a heatable annular chamber in said shell; and
   a heating unit in said annular chamber, said heating unit including at least one stationary inductor body formed of a plurality of tightly packed sheets connected together with welding seams, an inductor coil about said inductor body, said coil being resiliently mounted axially and radially of said inductor body, a radial gap between said coil and said inductor body and resilient elements in said gap supporting said coil on said inductor body, said resilient elements being flat spring plates in contact with an outer surface of said inductor body at intermediate points thereof.

3. A drawroll unit comprising
   a heatable galette having a cylindrical shell and a rotatable shaft concentrically within and connected to said shell;
   an electric motor drivingly connected to said shaft for driving said shaft within a first predetermined speed range up to a limiting speed at which damage occurs in a short time period;
   a housing;

at least one bearing rotatably supporting said shaft in said housing;

vibration damping means between each bearing and said housing for damping vibrations of said shaft in said housing occurring within a second speed range within said first predetermined speed range, said vibrations being of a nature to otherwise cause damage over a long time period.

4. A drawroll unit as set forth in claim 1 which further comprises resilient means connecting each said bearing to said housing in centered relation.

5. A drawroll unit as set forth in claim 4 wherein said vibration damping means includes a pair of O-rings between each said bearing and said stationary part to radially space each said bearing from said stationary part and define a circumferential gap.

6. A drawroll unit comprising
a cylindrical shell;
an end wall integral with one end of said shell;
a rotatable shaft secured to said end wall coaxially of said shell to define a heatable annular chamber in said shell; and
a heating unit in said annular chamber, said heating unit including at least one stationary inductor body formed of a plurality of tightly packed sheets connected together with welding seams, an inductor coil in said chamber about said inductor body, said inductor coil being resiliently mounted radially of said inductor body, and a spring biasing said inductor coil axially of said inductor body.

7. A drawroll unit comprising
a cylindrical shell;
an end wall integral with one end of said cylindrical shell and having a centrally disposed boss with a conically tapering bore extending mid-way of said cylindrical shell; and
a rotatable shaft secured to said end wall coaxially of said shell and said boss to define a heatable annular chamber in said cylindrical shell, said shaft having a first cylindrical section extending outwardly from said cylindrical shell, a conical section disposed mid-way of said cylindrical shell and matingly received in said bore of said boss mid-way of said shell and a second cylindrical section of less diameter than said first cylindrical section in the end wall.

8. A drawroll unit comprising
a cylindrical shell;
an end wall integral with one end of said shell;
a rotatable shaft secured to said end wall coaxially of said shell to define a heatable annular chamber in said shell;
a housing rotatably mounting said shaft therein; and
a temperature measurement sensor mounted in said housing and projecting into an annular groove in said shell, said sensor including a temperature sensing pin extending into said groove and a protective cover over said pin between said housing and said shell to preclude fibers from collecting on said pin, said protective cover having a gap therein for passage of air from said air from said annular chamber over said pin.

9. A drawroll unit as set forth in claim 1 wherein said damping means is at least one body of interlaced wire.

10. A drawroll unit as set forth in claim 9 wherein said body is an annular body.

11. A drawroll unit as set forth in claim 10 wherein said body has a square cross-section.

12. A drawroll unit as set forth in claim 9 which includes a plurality of bodies of interlaced wires circumferentially disposed about each said bearing and spaced from each other.

13. A drawroll unit as set forth in claim 12 which further comprises an annular bush between said bodies and said housing.

14. A drawroll unit as set forth in claim 1 further comprising a bush supporting each said bearing therein in spaced radial relation to said housing; and resilient means connecting said bush with said housing to permit radial movement of said bush.

15. A drawroll unit as set forth in claim 1 further comprising a plurality of circumferentially distributed balancing weights mounted at at least one axial end of said shell.

16. A drawroll unit as set forth in claim 1 further comprising a heating unit between said shell and said shaft, said heating unit including at least one stationary inductor body formed of a plurality of tightly packed sheets connected together with welding seams.

17. A drawroll unit as set forth in claim 1 further comprising a temperature measurement sensor mounted in said housing and projecting into an annular groove in said shell, said sensor including a temperature sensing pin extending into said groove and a protective cover over said temperature sensing pin between said housing and said shell to preclude fibers from collecting on said temperature sensing pin.

18. A drawroll unit as set forth in claim 14 wherein said resilient means includes a plurality of circumferentially spaced spring pins disposed between said bush and said housing.

19. A drawroll unit as set forth in claim 18 wherein said bush has an annular recess receiving an intermediate portion of each spring pin in spaced relation.

20. A drawroll unit as set forth in claim 18 wherein said bush has a plurality of bores receiving said pins and spaced from an intermediate portion of each pin.

21. A drawroll unit as set forth in claim 6 further comprising a clamping body mounting said spring and disposed coaxially of said coil.

22. A drawroll unit as set forth in claim 7 which further comprises a heating unit in said annular chamber, said heating unit including at least one stationary inductor body formed of a plurality of tightly packed sheets connected together with welding seams.

23. A drawroll unit as set forth in claim 8 wherein said sensor has a base in said housing supporting said pin and said cover is formed of two circumferentially spaced plates extending from said base to define said gap therebetween.

24. A drawroll unit as set forth in claim 15 wherein said shell includes a radially directed collar at an end of said shell, said collar having circumferentially disposed tapped holes for threadably receiving said balancing weights.

25. A drawroll unit as set forth in claim 24 wherein said collar is directed radially outwardly.

26. A drawroll unit as set forth in claim 24 wherein said holes are disposed angularly of a longitudinal axis of said shell.

27. A drawroll unit as set forth in claim 24 wherein said collar is crenellated.

28. A drawroll unit as set forth in claim 17 wherein said housing is spaced from said shaft to define a first annular gap for an inflow of ambient air and said housing is spaced from said shell to define a second annular gap for an outflow of air over said temperature measurement sensor.

29. A drawroll unit as set forth in claim 28 wherein said housing has an annular nose projecting radially inwardly towards said shaft within said first gap to control the flow of ambient air therethrough.

30. A drawroll unit as set forth in claim 16 wherein said sheets are in parallel and are set radially of said shaft.

31. A drawroll unit as set forth in claim 16 which further comprises a bracing tube concentric to said shaft and receiving said inductor body thereon.

32. A drawroll unit as set forth in claim 31 which further comprises a plurality of said inductor bodies disposed circumferentially of said bracing tube.

33. A drawroll unit as set forth in claim 16 wherein said heating unit includes an inductor coil about said inductor body, said coil being resiliently mounted axially and radially of said inductor body.

34. A drawroll unit as set forth in claim 33 further comprising a radial gap between said coil and said body and resilient elements in said gap supporting said coil on said body.

35. A drawroll unit as set forth in claim 34 wherein said resilient elements extend longitudinally over said inductor coil.

36. A drawroll unit as set forth in claim 17 wherein said sensor has a base supporting said temperature sensing pin and said protective cover is formed of two circumferentially spaced plates extending from said base to define a gap therebetween.

37. A drawroll unit as set forth in claim 36 wherein said pin projects axially beyond said plates.

38. A drawroll unit as set forth in claim 36 which further comprises thermic insulation between said pin and said base.

* * * * *

UNITED STATES PATENT AND TRADEMARK OFFICE
CERTIFICATE OF CORRECTION

PATENT NO. : 5,159,166

DATED : October 27, 1992

INVENTOR(S) : DRAWROLL UNIT

It is certified that error appears in the above-identified patent and that said Letters Patent is hereby corrected as shown below:

Column 21, line 61 "air from said air from said" should be -air from said-

Signed and Sealed this

Twenty-sixth Day of October, 1993

Attest:

BRUCE LEHMAN

*Attesting Officer*    *Commissioner of Patents and Trademarks*